(12) United States Patent
Hayashi

(10) Patent No.: US 7,930,276 B2
(45) Date of Patent: Apr. 19, 2011

(54) CONTENT EDIT APPARATUS AND CONTENT VERIFICATION APPARATUS

(75) Inventor: Junichi Hayashi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 12/096,706

(22) PCT Filed: Oct. 30, 2007

(86) PCT No.: PCT/JP2007/071440
§ 371 (c)(1),
(2), (4) Date: Jun. 9, 2008

(87) PCT Pub. No.: WO2008/056619
PCT Pub. Date: May 15, 2008

(65) Prior Publication Data
US 2009/0164526 A1 Jun. 25, 2009

(30) Foreign Application Priority Data
Nov. 9, 2006 (JP) .................................. 2006-304548

(51) Int. Cl.
*G06F 7/00* (2006.01)
*G06F 17/00* (2006.01)
(52) U.S. Cl. ................... 707/687; 707/694; 707/736
(58) Field of Classification Search ............... None
See application file for complete search history.

(56) References Cited

U.S. PATENT DOCUMENTS

| 6,968,058 | B1 | 11/2005 | Kondoh et al. | 380/200 |
|---|---|---|---|---|
| 7,006,660 | B2 | 2/2006 | Hayashi | |
| 7,272,239 | B2 | 9/2007 | Hayashi | |
| 2004/0107348 | A1 | 6/2004 | Iwamura | 713/176 |
| 2006/0020809 | A1 | 1/2006 | Hayashi | |
| 2006/0059201 | A1* | 3/2006 | Watanabe | 707/104.1 |

FOREIGN PATENT DOCUMENTS

| JP | 11-308564 | 11/1999 |
|---|---|---|
| JP | 2004-180278 | 6/2004 |
| JP | 2004-214806 | 7/2004 |
| JP | 2006-165881 | 6/2006 |
| JP | 2006-245772 | 9/2006 |

* cited by examiner

*Primary Examiner* — Jay A Morrison
(74) *Attorney, Agent, or Firm* — Fitzpatrick, Cella, Harper & Scinto

(57) ABSTRACT

This invention allows verifying whether or not an original image content has been altered, to specify all edit processes applied to the original image content, and to hold the edited content. To this end, upon inputting a digital content file to be edited, first verification data included in that file is verified. After the content is edited, edit record information for the content is generated. Upon completion of the edit process and outputting the edited content, second verification data is generated based on the verification result of first verification unit, the edit record, and the edited content. The edited content, the edit record, the verification result of the first verification unit, and the second verification data are combined as an edited digital content file, and the combined file is output.

15 Claims, 23 Drawing Sheets

FIG. 14

| FIRST VERIFICATION RESULT |
|---|
| EDIT 1 |
| EDIT 2 |
| . . . |
| EDIT n |

FIG. 15

| EDIT 1 |
|---|
| EDIT 2 |
| ... |
| EDIT n |

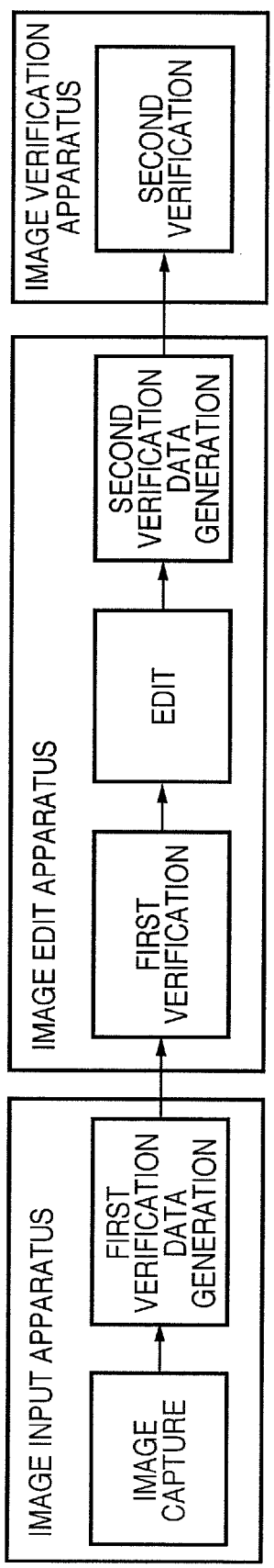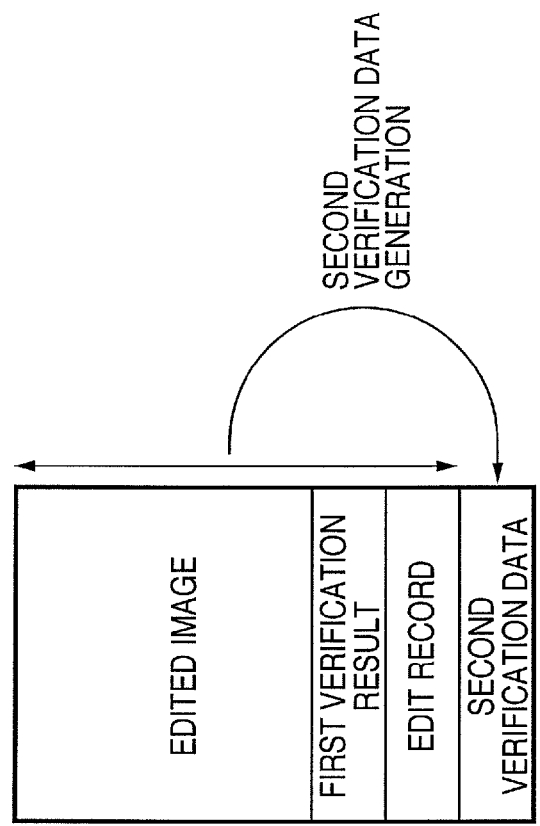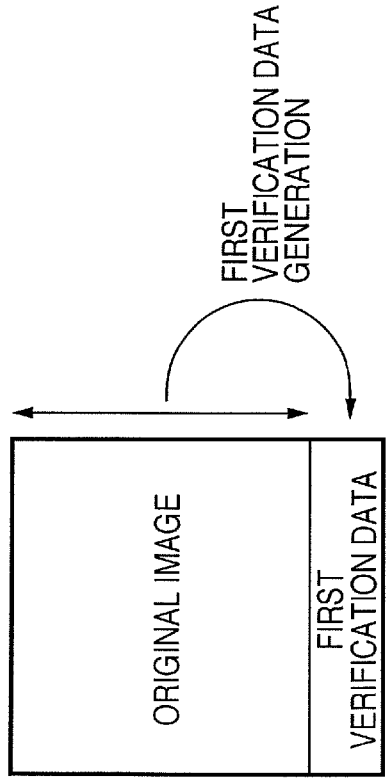

FIG. 22

| GAMMA CORRECTION |
| CONTRAST CORRECTION |
| LEVEL CORRECTION |

FIG. 23

| |
|---|
| GAMMA CORRECTION |
| $\gamma = 0.8$ |
| CONTRAST CORRECTION |
| 20 |
| LEVEL CORRECTION |
| − 20 |

CONTENT EDIT APPARATUS AND CONTENT VERIFICATION APPARATUS

TECHNICAL FIELD

The present invention relates to a technique for verifying alterations of contents such as image data and the like.

BACKGROUND ART

In recent years, video input apparatuses such as digital cameras and the like which digitize captured image information and record that information as digital data on a recording medium and the like have prevailed in place of conventional silver halide photos and 8-mm films. With these apparatuses, captured image information itself can be transferred to an information processing apparatus represented by a personal computer, and can be displayed. By communicating such image data using a communication line, the image data can be instantaneously transmitted anywhere in the world. Paying attention to the convenience and easy transfer of such information, insurance companies that deal with evidence photos in accident processes, and construction companies that deal with records of the progress of building sites are considering use of digital image data.

Such digital data has the following three requirements.

The first requirement concerns confirmation of the originality of the digital image data. Since digital image data is easy to alter using an application program such as a commercially available photo retouch tool or the like, the reliability of digital data is lower than the conventional silver halide photos, and its evidentiary weight is poor. Hence, it is required to verify whether or not the captured digital image data has been altered.

The second requirement concerns confirmation of the edit record for the digital image data. A digital image has a requirement which conflicts with the first requirement that the digital image is not to be altered, as described above; it is sometimes desired to allow editing to some extent. In this case, the edit process itself for the digital image data is permitted, but it is required to confirm the contents of the applied edit process later.

The third requirement concerns holding of the edited digital image data. As a method of holding image data, a method of holding original image data in place of the edited image data itself has been proposed. With this method, original image data is held by appending information (image processing parameters and the like) associated with the applied edit process to that data. However, in the case of the method of holding the original image data, for example, even when a reduction process is applied to image data as the edit process, the data size itself cannot be reduced, and handling of image data may be consequently impaired. Upon browsing the edited image data, an image process must be executed based on the information associated with the (applied) edit process before display, and it is not always efficient. Hence, it is required to hold the edited image data itself in place of the original image data.

As a method that meets the first and second requirements, a method disclosed in a reference: Japanese Patent Laid-Open No. 2004-180278 has been proposed. According to this reference, edit record information is appended to original image data, and a digital signature is also appended to the appended edit record information, thus meeting the first and second requirements.

However, the method described in the above reference cannot meet the aforementioned third requirement. Even if the method described in the reference is modified to hold edited image data in place of original image data so as to meet the third requirement, the originality of the original image data cannot be verified. That is, the first requirement cannot be met in turn.

DISCLOSURE OF INVENTION

The present invention has been made in consideration of the above problems. The present invention has as its object to provide a technique that allows verification of whether or not an original content has been altered, to specify all edit processes applied to the content, and to hold the edited content.

In order to achieve the object, a content edit apparatus according to the present invention comprises the following arrangement. That is, there is provided a content edit apparatus for editing a digital content file that stores a content to be verified, comprising: first verification means for verifying first verification data appended to the digital content file; edit means for editing the content in the digital content file; edit record generation means for generating edit record information of the content edited by the edit means; second verification data generation means for generating second verification data based on verification result information by the first verification means, the edit record information, and the edited content; and output means for combining the content edited by the edit means, the verification result information of the first verification means, the edit record information, and the second verification data to obtain an edited digital content file, and outputting the edited digital content file.

A content verification apparatus which verifies a digital content file output from the content edit apparatus comprises the following arrangement. That is, there is provided a content verification apparatus comprising: verification means for verifying second verification data included in the digital content file to be verified; and determination means for determining whether or not verification result information of the first verification means appended to the content indicates a success.

The present invention allows verification of whether or not an original content has been altered, to specify all edit processes applied to the content, and to hold the edited content.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 14 shows a display example of a verification result according to the embodiment;

FIG. 15 shows a display example of a verification result according to the embodiment;

FIGS. 16A to 16C show the sequence of processing of the overall system and the structure of a data file according to the embodiment;

FIGS. 22 and 23 show example of the edit record information according to the embodiment.

BEST MODE FOR CARRYING OUT THE INVENTION

Embodiments according to the present invention will be described in detail hereinafter with reference to the accompanying drawings.

FIRST EMBODIMENT

<Description of Overall Arrangement of System>

Figure 1:
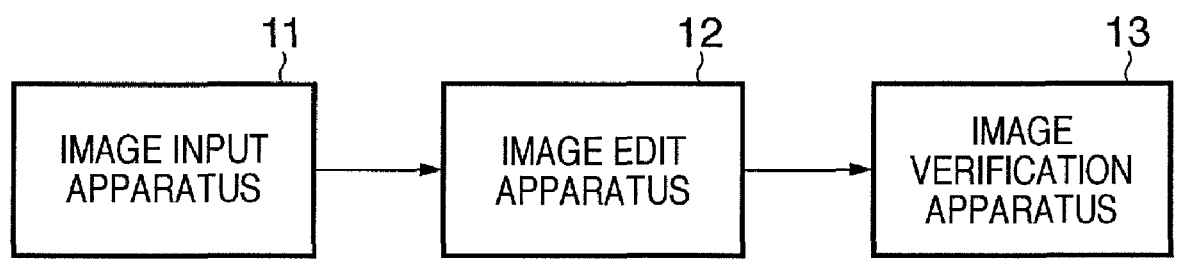
FIG. 1 is a diagram for explaining the overall arrangement of a system according to one embodiment.

FIG. 1 shows an example of the overall arrangement of a system according to this embodiment. The system according to this embodiment comprises an image input apparatus 11, image edit apparatus 12, and image verification apparatus 13.

In FIG. 1, the image input apparatus 11 comprises an image capturing unit, which generates and outputs image data by capturing an image. The image input apparatus 11 generates first verification data which allows verification of whether or not the image data has been altered, in addition to the generated image data. The image input apparatus 11 outputs the generated image data and first verification data to the image edit apparatus 12 of the next stage.

The image edit apparatus 12 applies various image edit processes to the image data output from the image input apparatus 11 of the previous stage, and outputs the edited image data. The image edit apparatus 12 according to this embodiment also executes a verification process using the first verification data as to whether or not the input image data has been altered, prior to the edit processes of the image data. Furthermore, the image edit apparatus 12 generates second verification data that allows verification of whether an edit record (edit history) has been altered, using the edited image data, edit record, and the verification result using the first verification data, after the edit processes of the image data, and outputs, to the image verification apparatus 13, the second verification data together with the edited image data, edit record, and verification result using the first verification data.

The image verification apparatus 13 verifies whether or not the image data input from the image edit apparatus 12 of the previous stage has been altered. In this embodiment, since the presence/absence of an alteration of the edit record of the image data is verified in addition to the input image data, the edit processes applied to the input image data are specified.

The aforementioned image input apparatus 11, image edit apparatus 12, and image verification apparatus 13 are implemented by connecting them via a network such as the Internet or the like. However, various data may be recorded on a computer-readable storage medium such as a removable medium or the like, and may be exchanged via the storage medium. Assume that the image edit apparatus 12 is permitted by the image verification apparatus 13 in advance to execute edit processes.

The overall arrangement example of the system of this embodiment has been described. An overview of the sequence of the processing of the entire system using the aforementioned apparatuses will be described below with reference to FIGS. 16A to 16C.

FIG. 16A is a schematic chart showing the processing of the overall system and the sequence of data in this embodiment. FIG. 16B shows the structure of image data which is input from the image input apparatus 11 to the image edit apparatus 12. FIG. 16C shows the structure of image data which is input from the image edit apparatus 12 to the image verification apparatus 13.

A photographer captures image data using the image input apparatus 11 such as a digital camera or the like. Then, a processor included in the image input apparatus 11 automatically generates first verification data for the captured image data. The first verification data generation process may be executed to have the captured image data as an argument. The image input apparatus 11 appends the generated first verification data to the captured image data, as shown in FIG. 16B, and outputs them as a single file. When the output destination is a storage medium such as a memory card or the like, that storage medium can be read by a card reader of the image edit apparatus 12. When the image input apparatus 11 comprises a communication unit which communicates with the Internet or public line network, the file may be transmitted to the image edit apparatus 12 via that communication unit.

An editor applies desired edit processes to the image data file output from the image input apparatus 11 using the image edit apparatus 12. If the image data file output from the image input apparatus 11 is recorded on a storage medium such as a memory card or the like, the editor sets that storage medium in the card reader to read the data file. The image edit apparatus 12 may input that data file via the Internet.

Upon input of the image data, the image edit apparatus 12 automatically verifies the first verification data (appended to the image data) to obtain a first verification result.

Then, the image edit apparatus 12 applies desired image processes to the image data based on an instruction of the editor. In this case, the image edit apparatus automatically generates and holds edit record information corresponding to the edit processes applied by the editor. At the time of output of the image data from the image edit apparatus 12 upon completion of the edit processes, the image edit apparatus 12 generates second verification data using the edited image data, first verification result, and edit record information. The image edit apparatus 12 appends the generated second verification data to the edited image data, as shown in FIG. 16C, and outputs them as a single file. When the output destination is a storage medium such as a memory card, disk, or the like, this storage medium can be read by a read drive of the image verification apparatus 13. When the image edit apparatus 12 comprises a communication unit which communicates with the Internet or public line network, the file may be transmitted to the image verification apparatus 13 via that communication unit.

A verifier verifies using the image verification apparatus 13 whether or not the edited image data in the file output from the image edit apparatus 12 has been altered. If the verification result is correct, the image verification apparatus 13 displays the edit record information appended to the edited image data on a screen together with that edited image data. The verifier can recognize the edit record applied to the image data by browsing the edited image data and edit record information displayed on the screen.

Prior to the description of the internal arrangements and processes of the image input apparatus 11, image edit apparatus 12, and image verification apparatus 13, an operation screen example (window) of the image edit processes in the image edit apparatus 12 and image verification apparatus 13 will be described below with reference to FIG. 17.

Figure 17:
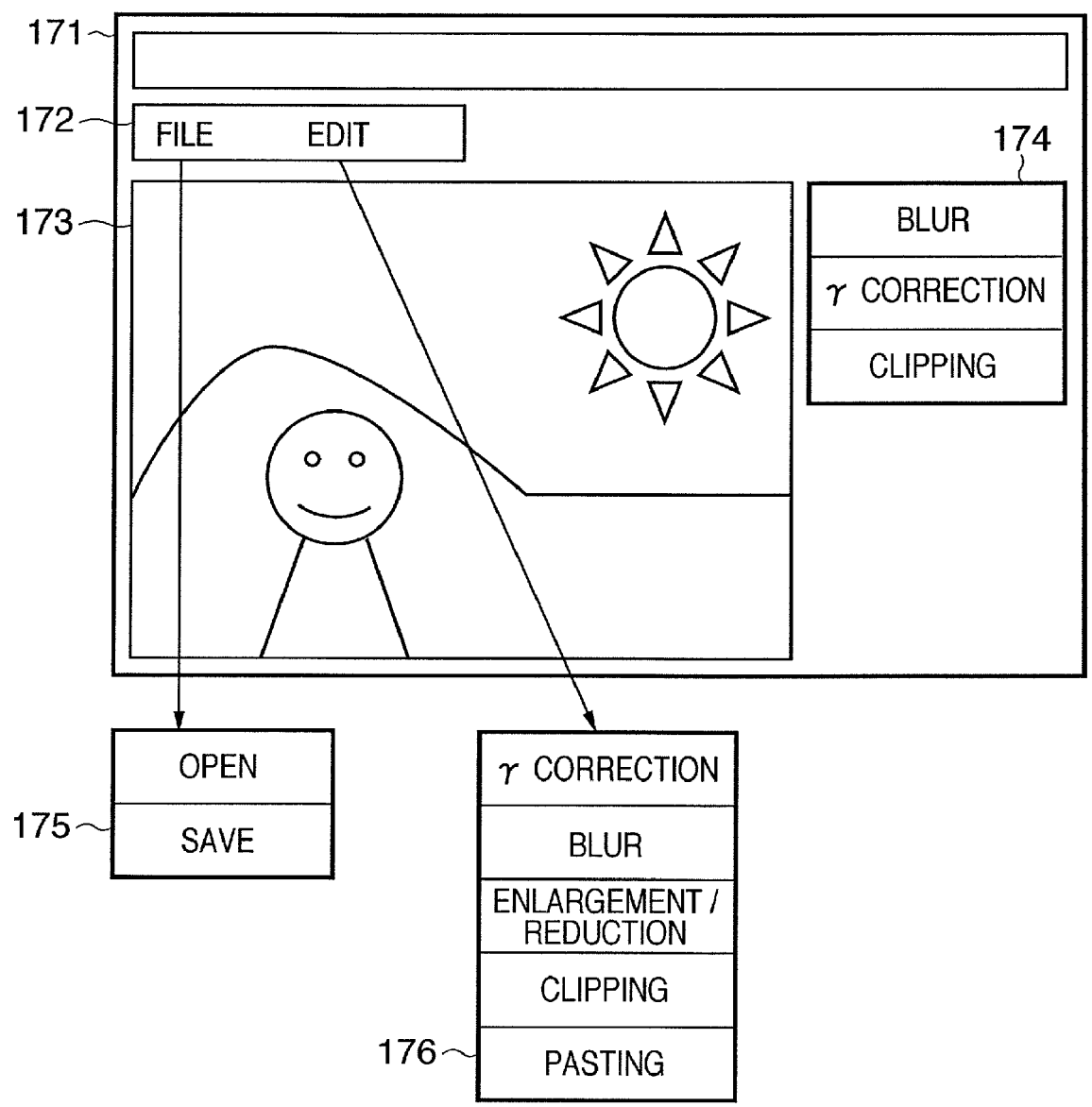
FIG. 17 shows a configuration example of a window shows a display example of a verification result according to the embodiment.

FIG. 17 shows a window when an image edit application program which runs on the image edit apparatus 12 or image verification apparatus 13 is executed. This application program is stored in an external storage device such as a hard disk drive or the like, and a CPU loads this program onto a RAM when it executes the program. The image edit apparatus 12 comprises a general-purpose information processing apparatus such as a normal personal computer or the like, or it may comprise a PDA or the like.

A window 171 shown in FIG. 17 has, on its upper part, a menu field 172 which allows the user to designate various commands for the image edit apparatus 12 (or image verification apparatus 13). When the user clicks a "file" or "edit" menu in the menu field 172 using a pointing device such as a mouse or the like, a submenu 175 or 176 is displayed. By clicking each command in the submenu using the mouse or the like, the corresponding command is issued to the image edit apparatus 12 (or image verification apparatus 13). Reference numeral 173 denotes an image viewer used to browse image data input to the image edit apparatus 12 or whose edit process is underway. Furthermore, reference numeral 174 denotes an edit record viewer used to browse the record of various edit processes applied to the image data. On the edit record viewer 174, an edit record is time-serially added every time the image edit apparatus 12 executes the image edit process. Alternatively, the edit record viewer 174 is used to display the edit record of an image of an input data file when the image verification apparatus 13 analyzes that data file.

By clicking an "open" command in the "file" menu, image data is input. In the case of the image edit apparatus 12, when the first verification data is appended to the input image data, the apparatus 12 automatically verifies the first verification data, and holds the verification result. After the first verification process, the image viewer 173 displays the image data.

Subsequently, by clicking various commands in the "edit" menu, the user executes desired image edit processes. The executed image edit processes are sequentially displayed on the edit record viewer 174, and the user can confirm the record of the executed image edit processes.

Finally, upon completion of the desired image edit processes, by clicking a "save" command in the "file" menu, the image data is output (saved). In this case, the image edit apparatus 12 generates second verification data using the edited image data, edit record, and the first verification result. Finally, image data obtained by combining these data is recorded.

Alternatively, the menu field has a "verification" menu and "verification data generation" menu (not shown). When the operator clicks the "verification" menu or "verification data generation" menu using the mouse or the like, the verification process of the first verification data or the generation process of the second verification data may be executed.

Note that the window shown in FIG. 17 is an example applicable to the present invention, and the present invention is not limited to such a specific window.

<Basic Arrangement of Image Input Apparatus>

Figure 2:
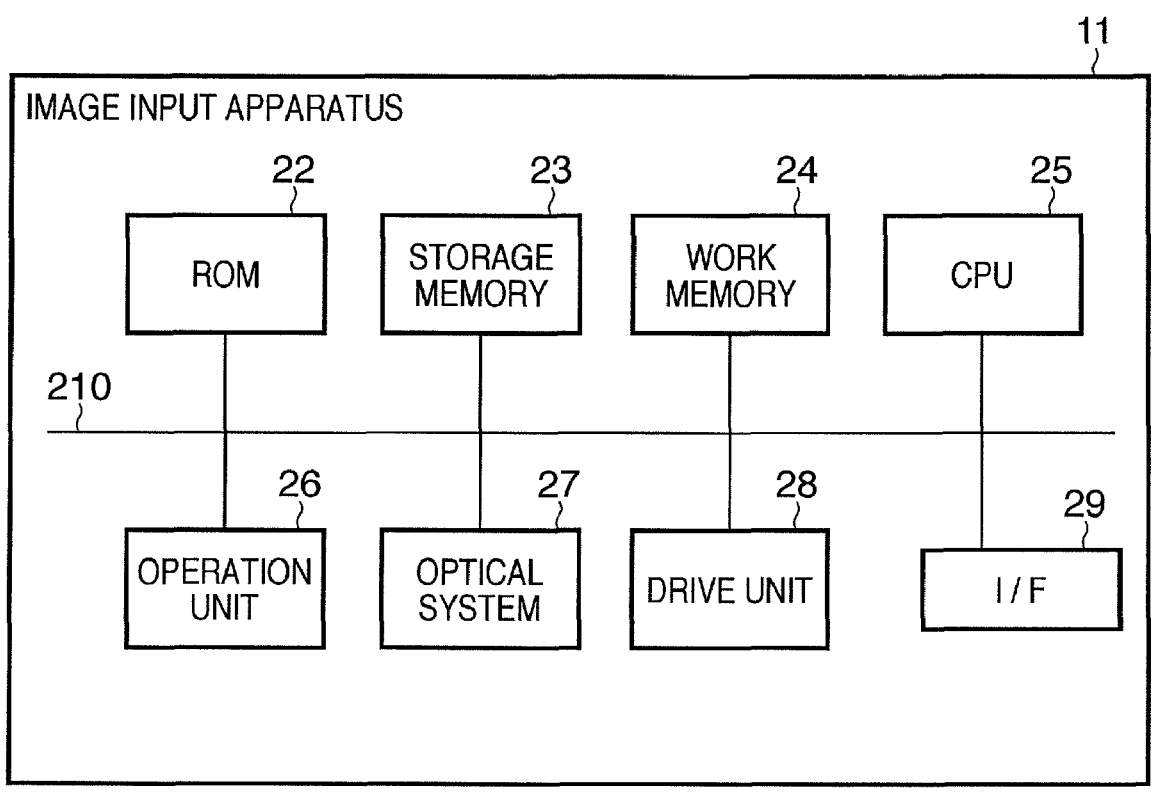
FIG. 2 is a block diagram showing the arrangement of an image input apparatus according to the embodiment.

The image input apparatus 11 applicable to this embodiment will be described below with reference to FIG. 2. FIG. 2 shows the basic arrangement of the image input apparatus 11 according to this embodiment. As shown in FIG. 2, the image input apparatus 11 according to this embodiment comprises a ROM 22, storage memory 23, work memory 24, CPU 25, operation unit 26, optical system 27, drive unit 28, and I/F 29, which are connected via a bus 210.

The image input apparatus 11 is implemented by, e.g., a generally prevalent digital camera, and can store digital image data generated by the optical system 27 in the storage memory 23 (normally, a detachable memory card) or the like when the user makes an image capturing instruction using the operation unit 26.

In FIG. 2, the ROM 22 is a read-only memory, and stores operation programs, and shared information required to generate verification data in advance. The storage memory 23 stores processed image data. The work memory 24 temporarily stores image data, and compression and various arithmetic processes of the image data are executed on this memory.

Upon detection of input of an image capturing instruction from the operation unit 26, the CPU 25 executes various arithmetic processes such as an image capturing process, compression process of image data, generation of first verification data, and the like in accordance with programs stored in advance in the ROM 22. The CPU 25 stores a file having the compressed image data and first verification data in the storage memory 23. If the interface 29 includes a communication interface, the CPU 25 transfers the image file (including the compressed image data and first verification data) stored in the storage memory to the image edit apparatus 12 in accordance with an instruction from the operation unit 26. The types of transfer protocols are not particularly limited (the file may be sent as an e-mail message or using FTP).

The operation unit 26 is a user interface which accepts various instructions such as an image capturing instruction, various parameter settings, and the like of the photographer.

The optical system 27 includes a charge coupled device CCD or optical sensor, and executes an image capturing process of an object, electric signal process, digital signal process, and the like in response to an image capturing instruction.

The drive unit 28 executes mechanical operations required to capture an image under the control of the CPU 25.

The I/F 29 is an interface with external devices such as a memory card, mobile terminal, communication device, and the like, and is used to send image data and verification data to these devices.

<Basic Arrangement of Host Computer>

Figure 3:
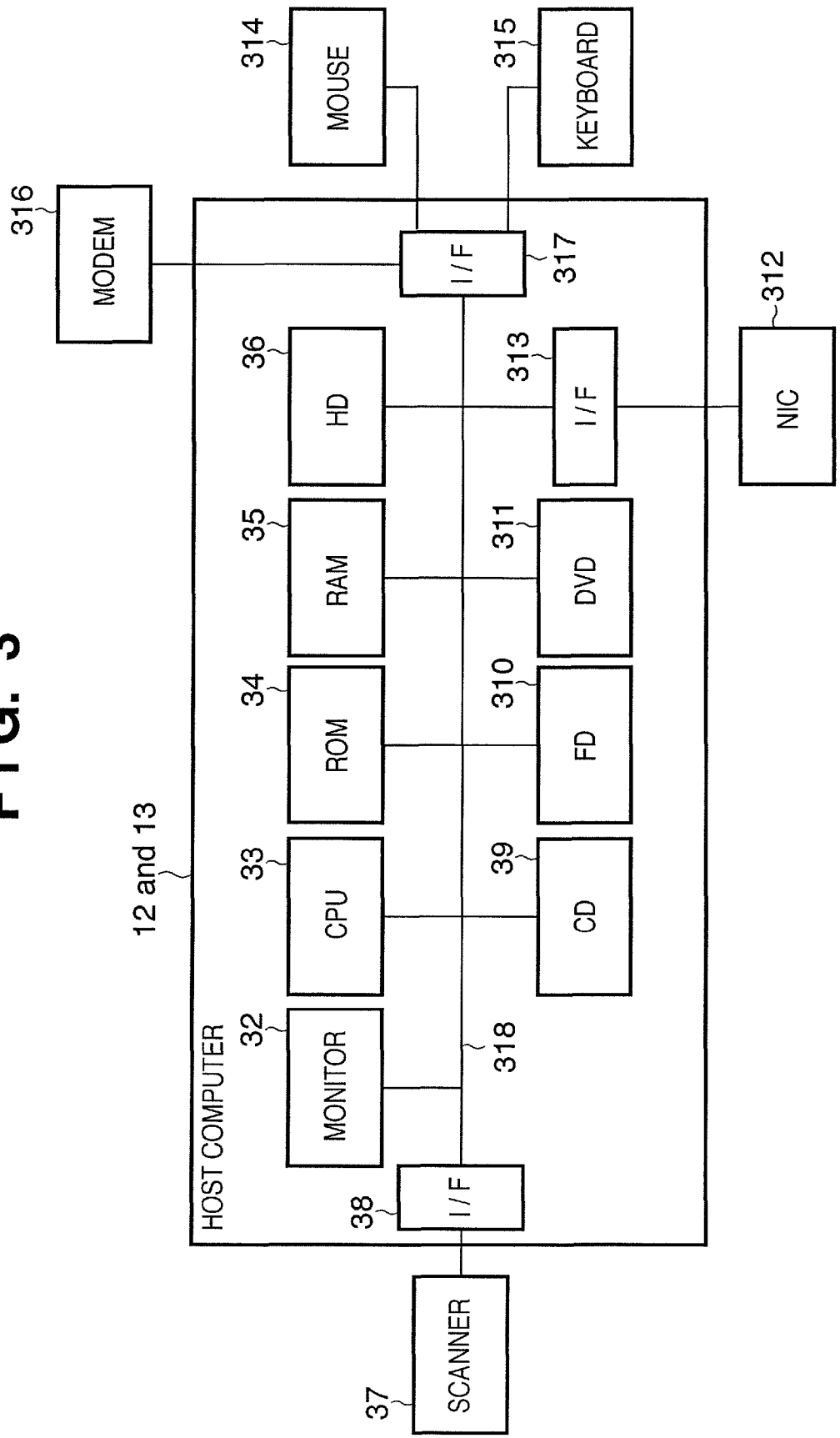
FIG. 3 is a block diagram showing the arrangement of a host computer according to the embodiment.

A host computer applicable to this embodiment will be described below with reference to FIG. 3. FIG. 3 shows the arrangement of the image edit apparatus 12 or image verification apparatus 13 according to this embodiment, and the relationship with its peripheral devices.

As shown in FIG. 3, each of the image edit apparatus 12 and image verification apparatus 13 has the basic arrangement of a host computer represented by a personal computer. For the sake of simplicity, the following description will be given under the assumption that FIG. 3 is a block diagram of the image edit apparatus 12. There is no hardware difference between the image edit apparatus 12 and image verification apparatus 13 except that either an application associated with the image edit process or that associated with the image verification process is installed.

The image edit apparatus 12 is implemented by a generally prevalent personal computer, as described above. The apparatus 12 can store image data in a hard disk (HD) 36, CD-ROM drive (CD) 39, floppy disk drive (FD) 310, DVD drive (DVD) 311, and the like, and can display the stored image data and the like on a monitor 32. Furthermore, the apparatus 12 can distribute these image data via the Internet using a network interface card (NIC) 312. The user inputs various instructions and the like using a mouse 314 and keyboard 315. Inside the image edit apparatus 12, respective blocks to be described below are connected via a bus 318 to be able to exchange various data.

In FIG. 3, reference numeral 32 denotes a monitor which can display various kinds of information from the image edit apparatus 12. Reference numeral 33 denotes a CPU which can control the operations of respective units in the image edit apparatus 12 or can execute programs loaded into a RAM 35. Reference numeral 34 denotes a ROM which stores a BIOS and boot program. Reference numeral 35 denotes a RAM which temporarily stores programs required to execute processes by the CPU 33 and image data to be processed. In the RAM 35, an OS and programs required for the CPU 23 to execute various processes to be described later are loaded.

Reference numeral 36 denotes a hard disk (HD) which is used to store an OS and image edit application program (image verification application program in case of the image verification apparatus), which are to be transferred to the RAM or the like, and to store and read out image data during the operation of the apparatus.

Reference numeral 37 denotes a scanner which optically scans a document or the like and can convert the scanned image into digital data. The scanner 37 is connected via an I/F 38. Reference numeral 39 denotes a CD-ROM drive which can read or write data from or in a CD-ROM (CD-R, CD-R/W, or the like) as one of external storage media. Reference numeral 310 denotes an FD drive which can read or write data from or in an FD (floppy® disk) as in the CD-ROM drive 39. Reference numeral 311 denotes a DVD-ROM (DVD-RAM) drive which can read data from a DVD-ROM and can write data in a DVD-RAM as in the CD-ROM drive 39.

When image processing programs are stored in the CD-ROM, FD, DVD-ROM, and the like, these programs are installed in the HD 36, and are transferred to the RAM 35 as needed.

Reference numeral 313 denotes an I/F which connects the image edit apparatus 12 to the NIC 312 connected to a network such as the Internet or the like so as to send image data stored in the RAM 35, HD 36, CD-ROM 39, FD 310, DVD 311, and the like onto the network. The image edit apparatus 12 transmits data onto the Internet or receives data from it via the I/F 313.

Reference numeral 317 denotes an I/F which connects the mouse 314 and keyboard 315 to the image edit apparatus 12. Various instructions input from the mouse 314 and keyboard 315 via the I/F 317 are input to the CPU 33.

<Arrangement of Image Input Apparatus>

The image input apparatus 11 applied to this embodiment will be described below with reference to FIG. 4. In the following description, assume that the power switch of the image input apparatus 11 is turned on, the OS is loaded into the work memory 24, and the application required to implement the processes to be described in this embodiment are loaded onto the RAM 305. Also, respective processors are implemented by the CPU and programs executed by the CPU.

Note that this embodiment is not limited to such specific implementation, and the processes may be executed by the aforementioned personal computer. In this case, the respective processors are implemented by the corresponding programs, the CPU 33 which executes these programs, and peripheral hardware components in some cases.

Figure 4:
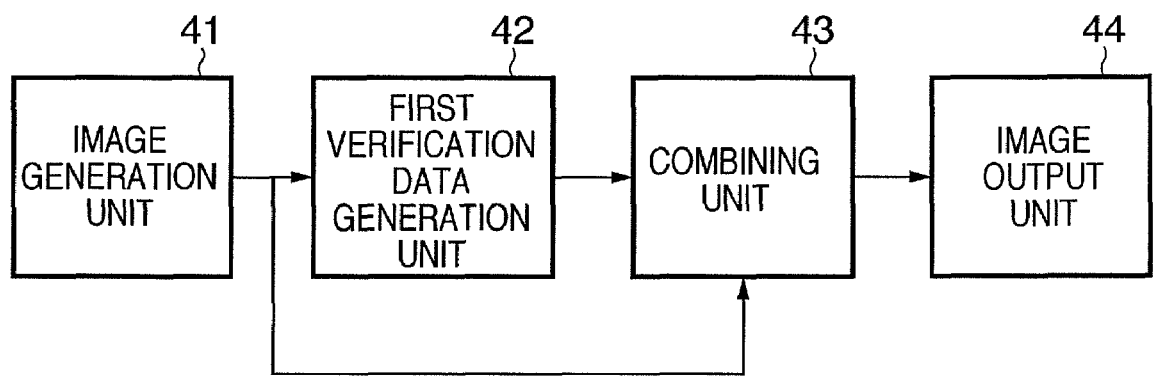
FIG. 4 is a block diagram showing the arrangement of the image input apparatus according to the embodiment.

As shown in FIG. 4, the image input apparatus 11 according to this embodiment comprises an image generation unit 41, first verification data generation unit 42, combining unit 43, and image output unit 44.

Note that the image input process to be described below may be implemented by a software process. In this case, the aforementioned units should be considered as conceptual functions which are required for the process.

In FIG. 4, the image generation unit 41 has an optical sensor such as a CCD (charge coupled device) as the optical system 27, a microprocessor for controlling the optical system, and the like. The unit 41 acquires a video signal generated by the optical system and optical sensor as image information, and forms image data. The unit 41 applies an electric signal process, digital signal process, and the like to the formed image data. The unit 41 may also apply an image compression process such as JPEG or the like to the image data based on an instruction from the operation unit 26. The unit 41 outputs the generated image data to the first verification data generation unit 42 and combining unit 43 of the next stage.

The first verification data generation unit 42 generates first verification data based on the image data output from the image generation unit 41, and outputs the generated first verification data to the next combining unit 43. Note that the image data used upon generation of the first verification data is the same as that stored in the image data file. That is, assuming that the image input apparatus is a digital camera, the unit 42 generates the first verification data based on image data that has undergone a JPEG encoding process. Alternatively, if the user does not give the instruction for any JPEG encoding process using the operation unit 26, the unit 42 generates the first verification data which does not undergo the JPEG encoding process.

As the first verification data in this embodiment, a MAC (Message Authentication Code), digital signature, and the like can be applied.

When the MAC is adapted, a MAC value is calculated to have the image data and private information as arguments. Upon verification, the verification side calculates a MAC value from the private information and image data, and compares it with the MAC appended to the image data.

When the digital signature is adopted, a Hash value of image data is calculated using a one-way function such as a Hash function or the like, and signature data is generated using a private key. Upon verification, a Hash value is calculated from the image data again. A Hash value of the signature data appended to the image data is generated using a public key, and the two Hash values are compared to verify the image data. Since the generation methods of the MAC and digital signature are state-of-the-art techniques, no more detailed explanation will be given.

When the MAC is used as the first verification data, private information required to generate the MAC must be shared by the image input apparatus 11 and the image edit apparatus 12 to be described later. For this reason, the ROM 22 in the image input apparatus 11 and the ROM 34 or HD 36 in the image edit apparatus 12 hold common private information, and the first verification data generation unit 42 uses that private information as needed.

Alternatively, a tamper-resistant device such as an IC card or the like holds the private information, and the IC card is connected to the image input apparatus 11 and image edit apparatus 12 via their I/F 29, I/F 38, and the like. Then, the first verification data generation unit 42 may acquire and use the private information from the IC card.

Alternatively, the image input apparatus 11 may generate new private information, which may be used. In this case, the generated private information may be held in a tamper-resistant device such as an IC card or the like or may be transmitted to the image edit apparatus 12 after encryption.

On the other hand, when the digital signature is applied as the first verification data, a private key is required inside the image input apparatus 11 so as to generate the digital signature. For this purpose, the private key is held in advance in the ROM 22 in the image input apparatus 11, and the first verification data generation unit 42 uses that private key as needed. Alternatively, a tamper-resistant device such as an IC card or the like holds the private key, and the IC card is connected to the image input apparatus 11 via the I/F 29. Then, the first verification data generation unit 42 may acquire and use the private key from the IC card. Alternatively, the image input apparatus 11 may generate a new private key, which may be used. In either case, a public key corresponding to the private key used by the first verification data generation unit 42 is required in the image edit apparatus 12 to be described later. For this purpose, the combining unit 43 of the next stage appends the corresponding public key to the image data, and sends them to the image edit apparatus 12. Alternatively, a server (not shown) may hold the public key, and information (URL or the like) indicating the holding location of the public key on the server may be recorded in the image data. Then, the image edit apparatus may acquire the public key from the server using the information as needed.

The combining unit 43 inputs the image data output from the image generation unit 41 of the previous stage and the first verification data output from the first verification data generation unit 42, combines these data into one file, and outputs the file.

Figure 6:
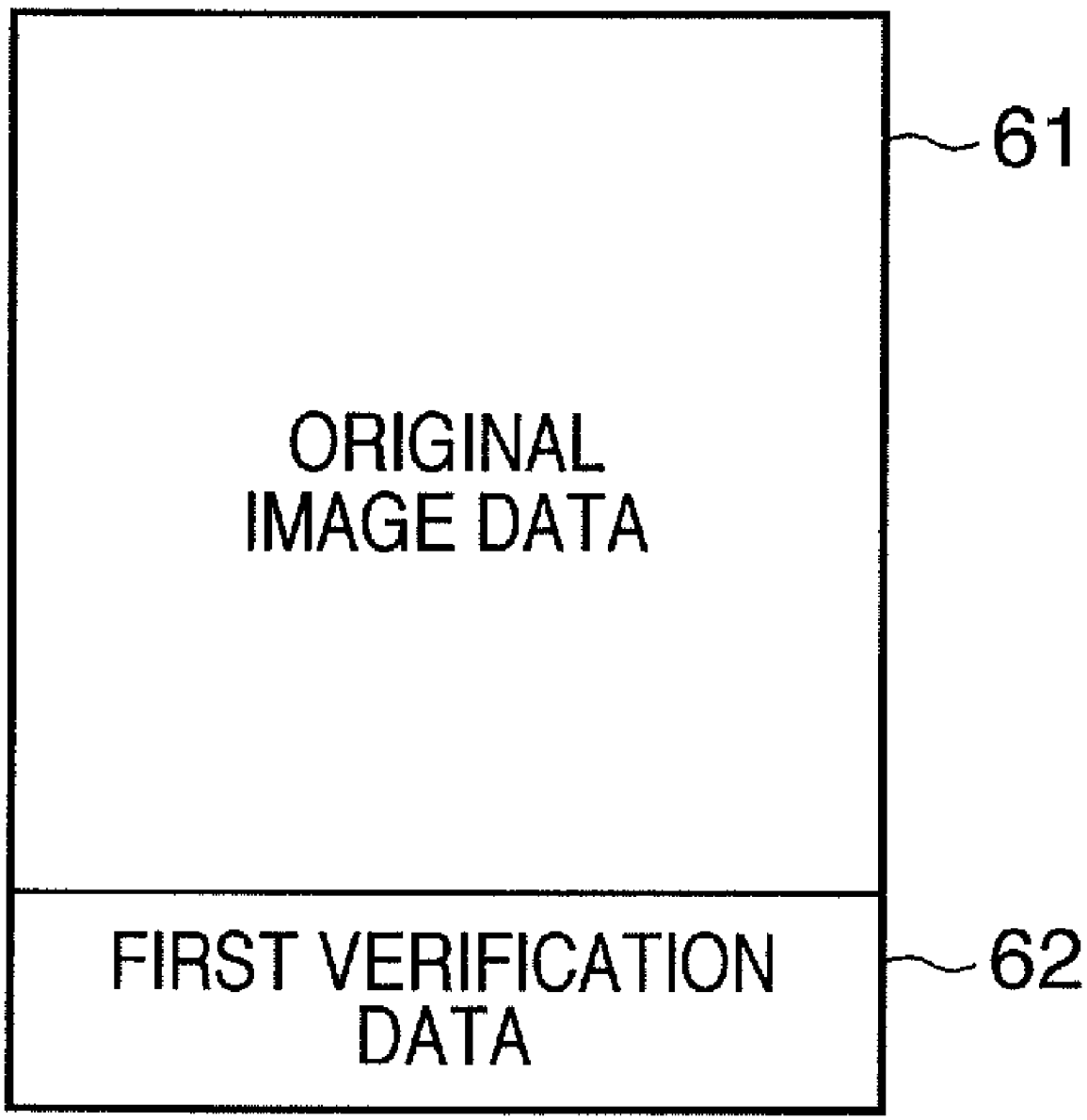
FIG. 6 shows the format of original image data according to the embodiment.

This embodiment exemplifies, as the combining method, that first verification data 62 is coupled after image data 61, as shown in FIG. 6. However, the present invention is not limited to such specific method, and the first verification data may be recorded in the header of original image data which is formatted by Exif or the like.

The image output unit 44 records the image data output from the combining unit 43 of the previous stage onto a recording medium such as a removable medium or the like, or transmits it to a predetermined host via a wired/wireless network.

Figure 5:
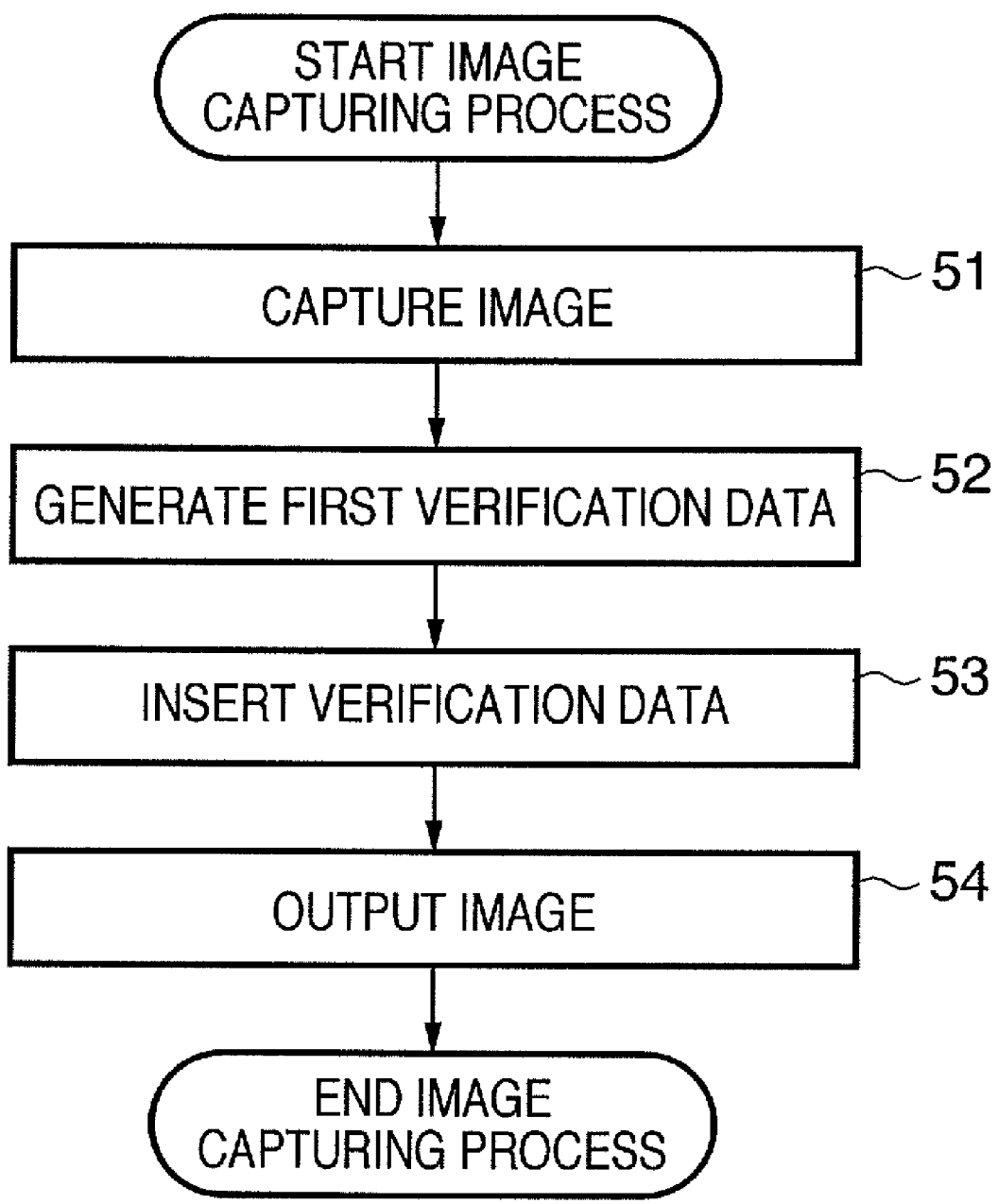
FIG. 5 is a flowchart showing the sequence of an image capturing process according to the embodiment.

The operation of the image input apparatus 11 of this embodiment is as described above. To clarify the operation more, the image capturing process of the image input apparatus 11 will be described below with reference to the flowchart shown in FIG. 5. FIG. 5 shows the process sequence to be executed by the CPU 25.

The image generation unit 41 captures image data (step 51). The first verification data generation unit 42 generates first verification data based on the image data and private information (assume that the private information is stored in the ROM 22) (step 52). The combining unit 43 inserts the first verification data generated by the first verification data generation unit 42 into the image data captured by the image generation unit 41 (step 53). Finally, the image output unit 44 outputs the image data generated by the combining unit 43 as one file (step 54).

The sequence of the image capturing process of the image input apparatus 11 according to this embodiment has been explained.

<Arrangement of Image Edit Apparatus>

The image edit apparatus 12 applied to this embodiment will be described below with reference to FIG. 7. In the following description, assume that the power switch of the image edit apparatus 12 is turned on, the OS is loaded into the RAM 35, and the image edit application required to implement the process to be described in this embodiment is loaded from the HD 36 onto the RAM 35. Therefore, respective processors are implemented by the corresponding programs, the CPU 33 which executes these programs, and peripheral hardware components in some cases.

Figure 7:
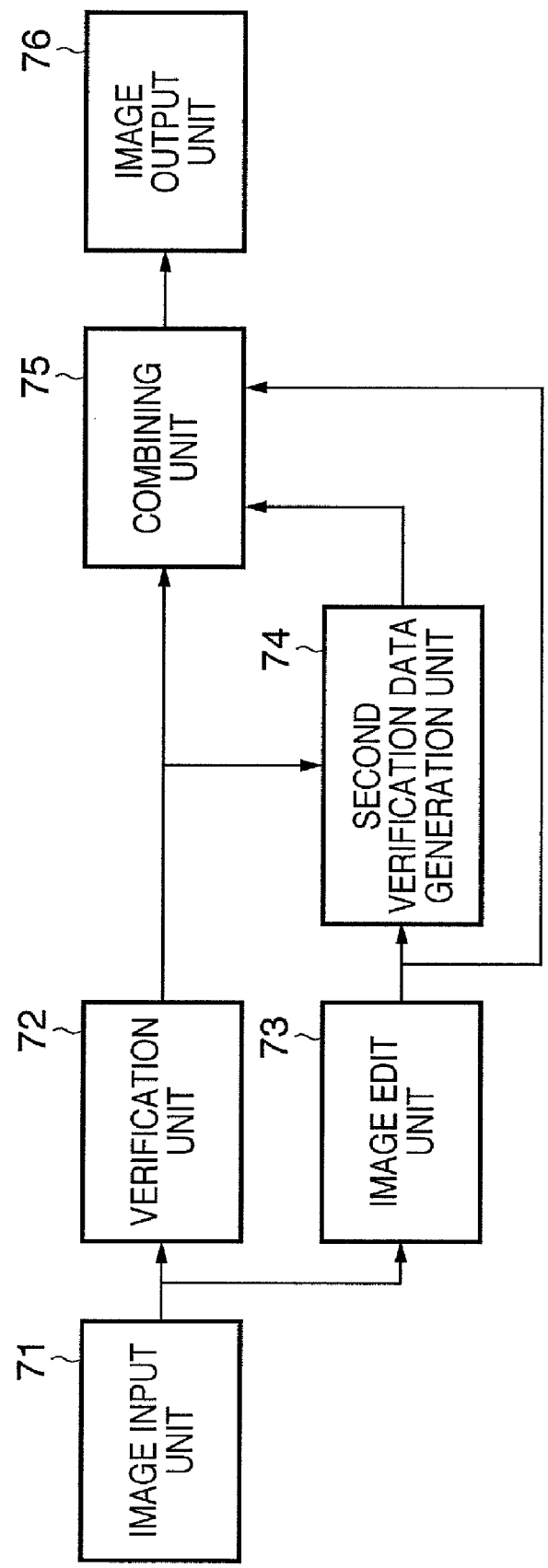
FIG. 7 is a block diagram showing the arrangement of an image edit apparatus according to the embodiment.

As shown in FIG. 7, the image edit apparatus 12 according to this embodiment comprises an image input unit 71, verification unit 72, image edit unit 73, second verification data generation unit 74, combining unit 75, and image output unit 76.

Note that in the following description, the functions of the respective processors of the image edit apparatus 12 are implemented by software processes. However, some or all of these functions may be implemented by hardware.

In FIG. 7, the image input unit 71 inputs the image data file input from the image input apparatus 11. It would be easier to understand if we assume that the image input unit 71 inputs the image data file output from the image output unit 44 in FIG. 4 via a removable medium and/or a network.

The verification unit 72 verifies using the image data in the input image data file and the first verification data appended to that image data whether or not the image data has been altered. That is, the verification unit 72 verifies whether or not an alteration has occurred between this image edit apparatus 12 and the image input apparatus 11. The verification unit 72 outputs the first verification result to the verification data generation unit 74 and combining unit 75 of the next stage.

The first verification process executed by the verification unit 72 must correspond to the aforementioned first verification data generation unit 42. That is, when the first verification data generation unit 42 generates a MAC, the verification unit 72 executes the verification process using the MAC. On the other hand, when the first verification data generation unit 42 generates a digital signature, the verification unit 72 executes the verification process using the digital signature. Note that the verification methods using the MAC and digital signature are state-of-the-art techniques, and a description thereof will not be given.

Note that the first verification result in this embodiment is information which indicates that "an image has not been altered" or "an image has been altered". Therefore, the first verification result suffices to be expressed by 1 bit. The verification result of the verification unit 72 is temporarily recorded in the RAM 35, HD 36, or the like, and is read out by the second verification data generation unit 74 and combining unit 75 as needed.

The image edit unit 73 allows the user to apply desired image edit processes to the input image data using the mouse 314, keyboard 315, and the like. Every time one edit process is applied, the unit 73 stores information indicating the type of that edit process as an edit record in storage device such as the RAM 35 or the like. When the unit 73 detects that the operator inputs a save instruction by operating the mouse or the like, it outputs the stored edit record information and edited image data to the second verification data generation unit 74 and combining unit 75 of the next stage.

Note that the image edit processes in this embodiment include various image processes such as "luminance correction", "color conversion", "gamma correction", "contrast correction", "level correction", "clipping", "pasting", and the like, or their combinations. Every time the image edit process is applied, the image edit unit 73 records the record information of the applied image edit process in the RAM 35, HD 36, or the like.

FIG. 22 and FIG. 23 show examples of the edit record information according to this embodiment. In these examples, "gamma correction", "contrast correction" and "level correction" are applied to the image data. FIG. 22 shows an example of the edit record information including only the information which can identify the type of applied image edit process. On the other hand, FIG. 23 shows an example of the record information including parameters which relates to the image edit process as well as the information which can identify the type of applied image edit process.

The "precision" of the information to be output as the record information may be that including detailed image processing parameters which can perfectly reproduce the applied image processes later, as shown in FIG. 23. Or the "precision" may include simple information that merely specifies the applied image processes, as shown in FIG. 22. The user may select desired "precision" in association with the record information to be output, and the record information with the selected "precision" may be output.

The second verification data generation unit 74 generates second verification data using the first verification result output from the verification unit 72, the edited image data output from the image edit unit 73, and the edit record, and outputs the generated second verification data to the combining unit 75 of the next stage.

In this embodiment, assume that verification data (i.e., that appended to the original image data) generated in the image input apparatus 11 will be referred to as first verification data, and verification data (i.e., that appended to the edited image data) generated in the image edit apparatus 12 will be referred to as second verification data, for the sake of descriptive convenience.

The second verification data generated by the second verification data generation unit 74 can use a MAC, digital signature, or the like.

Note that the type of verification data generated by the second verification data generation unit 74 need not always match that of verification data generated by the aforementioned first verification data generation unit 42. That is, a MAC may be generated as the first verification data, and a digital signature may be generated as the second verification data. Or a digital signature may be generated as the first verification data, and a MAC may be generated as the second verification data.

Even when verification data of the same type are generated as the first and second verification data, different data may be used for private information (in case of the MAC) and private key (in case of the digital signature) used to generate the first and second verification data.

The second verification data generation unit 74 desirably uses the input "first verification result", "edited image", and "edit record" together upon generation of verification data. With this process, the integrity of association of the "first verification result", "edited image", and "edit record" can also be guaranteed. That is, an alteration that replaces these pieces of information with each other can be prevented.

Alternatively, the second verification data generation unit 74 may generate verification data for each of the "first verification result", "edited image", and "edit record". In this case, the unit 74 appends information required to identify each other's data to each of the "first verification result", "edited image", and "edit record", and then generates respective verification data, thus guaranteeing the integrity of association.

The combining unit 75 inputs the first verification result output from the verification unit 72, the second verification data output from the second verification data generation unit 74, and the edited image and edit record information output from the image edit unit 74, and combines and outputs these data.

Figure 9:
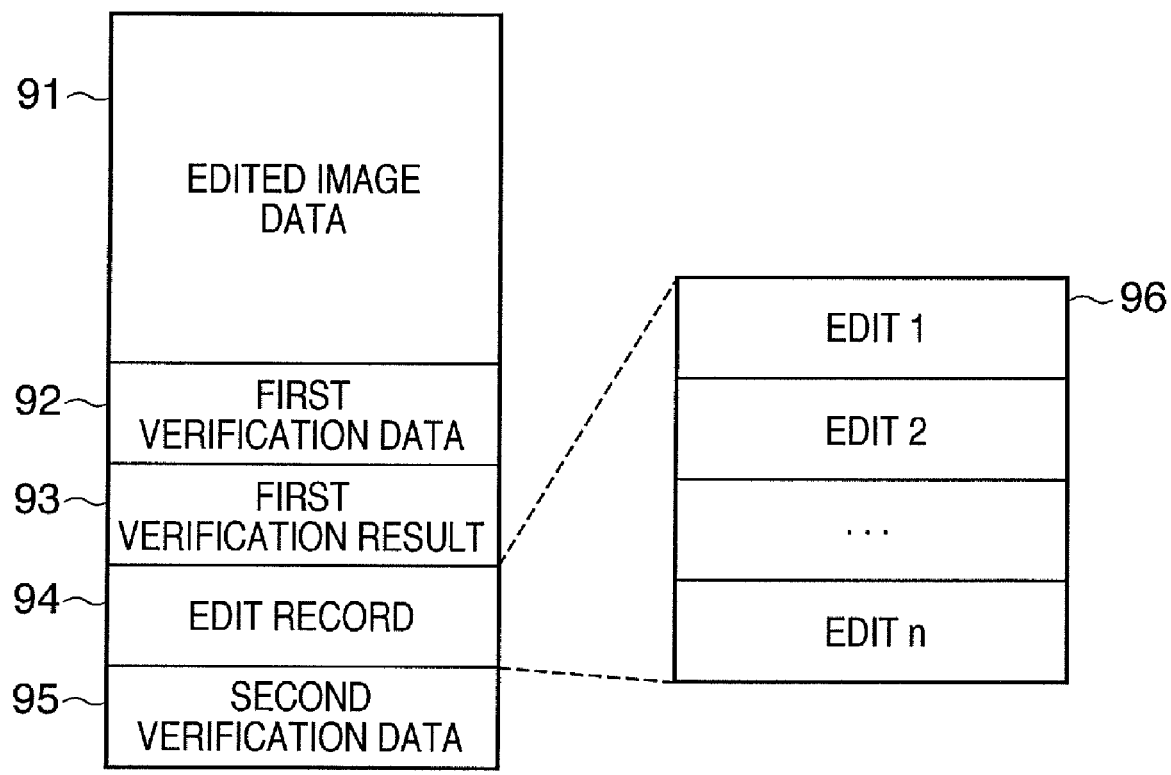
FIG. 9 shows the format of edited image data according to the embodiment.

This embodiment exemplifies, as the combining method, to couple first verification data 92, a first verification result 93, an edit record 94, and second verification data 95 in turn after edited image data 91, as shown in FIG. 9. However, the present invention is not limited to such specific method, and the first verification data may be recorded in the header of original image data which is formatted by Exif or the like.

Upon execution of the plurality of image edit processes, as described above, respective edit records are coupled and recorded as the edit record 94, so that the respective executed edit records can be specified, as denoted by reference numeral 96 in FIG. 9. Note that the present invention is not limited to this, and the edit record information may be described using a language such as XML or the like.

The image output unit 76 records the image data output from the combining unit 75 of the previous stage onto a recording medium such as a removable medium or the like, or transmits it to a predetermined host via a wired/wireless network.

Figure 8:
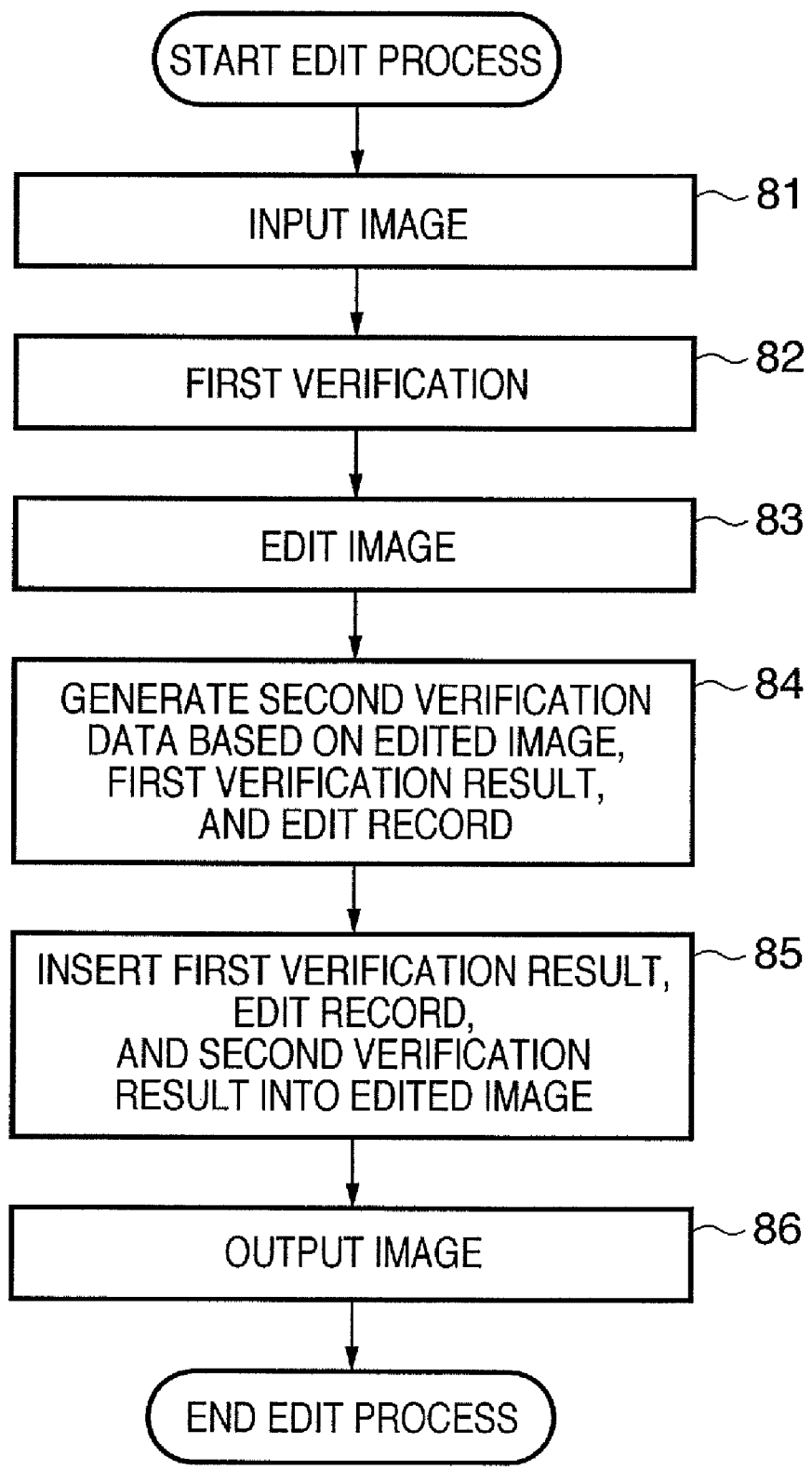
FIG. 8 is a flowchart showing the sequence of an edit process according to the embodiment.

The image edit apparatus 12 of this embodiment has been described. To clarify the aforementioned processes more, the image edit processing of the image edit apparatus 12 will be described below with reference to the flowchart shown in FIG. 8. FIG. 8 shows the processing sequence of the image edit application program to be executed by the CPU 33.

The image input unit 71 inputs image data (step 81). Next, the verification unit 72 verifies the first verification data appended to the input image data (step 82). After that, the image edit unit 73 applies desired image edit processes to the input image data (step 83). Upon completion of all the edit processes (upon detection of a save instruction input by the operator), the second verification data generation unit 74 generates second verification data based on the image data edited by the image edit unit 73, the edit record, and the first verification result of the verification unit 72 (step 84). The combining unit 75 inserts the first verification result, edit record, and second verification data in the image data edited by the image edit unit 73 (step 85). Finally, the combining unit 75 outputs the generated image data as one file from the image output unit 76 (step 86).

When an image processing application or the like executes the aforementioned edit processing, it automatically executes the processes of steps 81 and 82 upon loading image data. And/or the application may automatically execute the processes of steps 84, 85, and 86 upon saving the edited image data. In such a case, the user of the image processing application can execute the edit processes of image data without considering the first verification process and the second verification data generation process.

The sequence of the image edit processing of the image edit apparatus 12 according to this embodiment has been explained.

<Arrangement of Image Verification Apparatus>

The verification process of the image verification apparatus 13 of this embodiment will be described below. Since the apparatus arrangement is the same as that of the image edit apparatus 12 (FIG. 3), the following description will be given using reference numerals of FIG. 3.

In the following description, assume that the power switch of the image verification apparatus 13 is turned on, the OS is loaded into the RAM 35, and the image edit application required to implement the process to be described in this embodiment is loaded from the HD 36 into the RAM 35. Therefore, respective processors are implemented by the corresponding programs, the CPU 33 which executes these programs, and peripheral hardware components in some cases.

Figure 10:
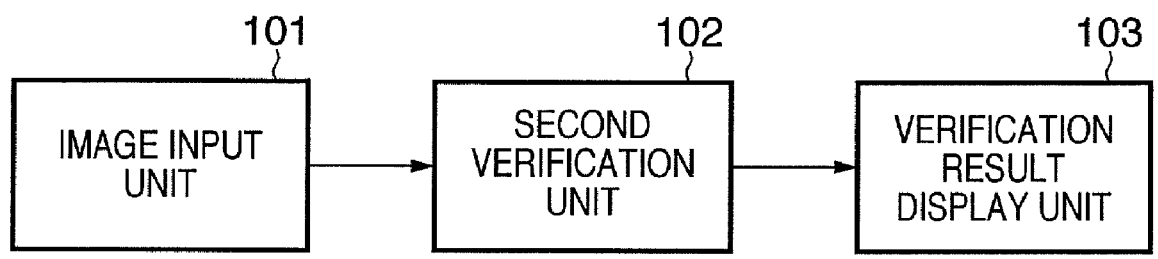
FIG. 10 is a block diagram showing the arrangement of an image verification apparatus according to the embodiment.

As shown in FIG. 10, the image verification apparatus 13 of this embodiment comprises an image input unit 101, second verification unit 102, and verification result display unit 103.

Note that in the following description, the functions of the respective processors of the image verification apparatus 13 are implemented by software processes. However, some or all of these functions may be implemented by hardware.

In FIG. 10, the image input unit 101 inputs image data output from the aforementioned image edit apparatus 12. It would be easier to understand if we assume that the image input unit 101 inputs the image data file output from the image output unit 76 in FIG. 7 via a removable medium and/or a network.

The second verification unit 102 analyzes the input image data, and executes a second verification process using the edited image data, first verification result, edit record, and second verification data included in the input image data. That is, the second verification unit 102 verifies if the image data has been altered in the course of the image input apparatus 11, image edit apparatus 12, and image verification apparatus 13. The second verification unit 102 outputs a second verification result, the first verification result to be verified, and the edit record to the verification result display unit 103 of the next stage.

In this embodiment, assume that a verification result using the aforementioned first verification data will be referred to as a first verification result, and that using the second verification data will be referred to as a second verification result, for the sake of descriptive convenience.

The second verification process executed by the second verification unit 102 must correspond to the second verification data generation unit 74 described above. That is, when the second verification data generation unit 74 generates a MAC, the second verification unit 102 executes the verification process using the MAC. On the other hand, when the second verification data generation unit 74 generates a digital signature, the second verification unit 102 executes the verification process using the digital signature.

Note that the second verification result in this embodiment indicates that "the edit record and first verification result have not been altered" or "at least one of the edit record and first verification result has been altered". When the second verification data is not appended, information indicating that "it is impossible to execute verification" may be output.

The verification result display unit 103 inputs the first verification result, edit record, and second verification result output from the second verification unit 102 of the previous stage, and displays the verification result on the monitor 32 or the like using the respective pieces of information.

When the second verification result is information indicating that "at least one of the edit record and first verification result have been altered", the verification result display unit 103 displays a message indicating this, thus ending the processing. On the other hand, when the second verification result is information indicating that "the edit record and first verification result have not been altered", the unit 103 displays the input first verification result and edit record on the monitor 32, as shown in FIG. 14.

Figure 11:
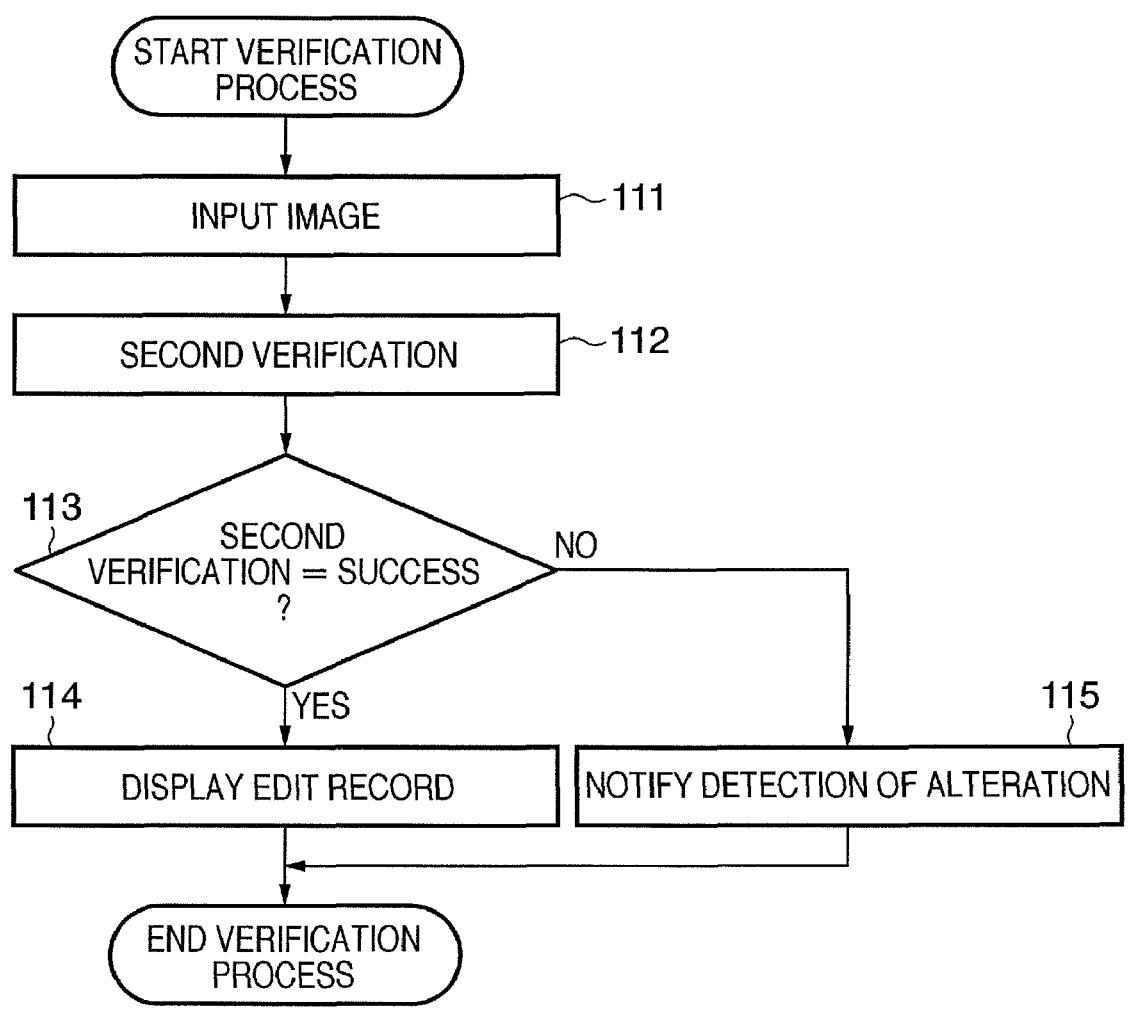
FIG. 11 is a flowchart showing the sequence of a verification process according to the first embodiment.

The arrangement of the image verification apparatus of this embodiment has been described. To clarify the aforementioned processes more, the image verification process of the image verification apparatus 13 will be described below with reference to the flowchart shown in FIG. 11. FIG. 11 shows the processing sequence of the image verification application program to be executed by the CPU 33.

The image input unit 101 inputs an image data file to be verified (step 111). The second verification unit 102 executes the second verification process based on the edited image data, first verification result, edit record, and second verification data included in the input image data (step 112). It is checked if the verification process has succeeded (step 113). If the verification process has succeeded, the process advances to step 114; if it has failed, the process advances to step 115. Finally, if the verification process has succeeded, the verification result display unit 103 displays the first verification result and edit record shown in FIG. 14. On the other hand, if the verification process has failed, the unit 103 displays a message indicating that "the verification process has failed".

The sequence of the verification process of this embodiment has been described.

According to the aforementioned image verification process, when the message displayed on the screen indicates that the verification has failed, a verifier can recognize that a third party has altered the image in the interval from the image input apparatus 11 to the image verification apparatus 13. When the first verification result and edit record are displayed, as shown in FIG. 14, and the first verification result indicates "no alteration", the verifier can recognize that the image edit apparatus 12 alone applied the edit processes to the image data. In addition, since the edit record of the image edit apparatus 12 is displayed, the verifier easily recognizes whether or not to apply the image edit processes that have changed the originality of the image data. For example, assume that the image input apparatus 11 inputs an image of an incident site to be inserted in a newspaper. When the input image is to be inserted in the newspaper as a monochrome image, the image edit apparatus 12 must apply an edit process for converting a color image into a monochrome image. According to this embodiment, the operator of the image verification apparatus 13 can determine by checking the display result in FIG. 14 whether or not the edit contents of the image edit apparatus 12 include permissible edit processes.

21 Modification Example of Sequence of Verification Process>

In the verification process of the image verification apparatus 13 described above, when the verification process of the second verification unit 102 has succeeded, that is, when the image has not been altered other than the image edit apparatus 12, the first verification result and edit record are finally displayed, as shown in FIG. 14. However, the present invention is not limited to such specific sequence, and the display result of the verification result display unit 103 may be controlled in consideration of the contents of the first verification result inside the second verification unit 102. A modification example of the sequence of the verification process in this case will be explained below.

Figure 12:
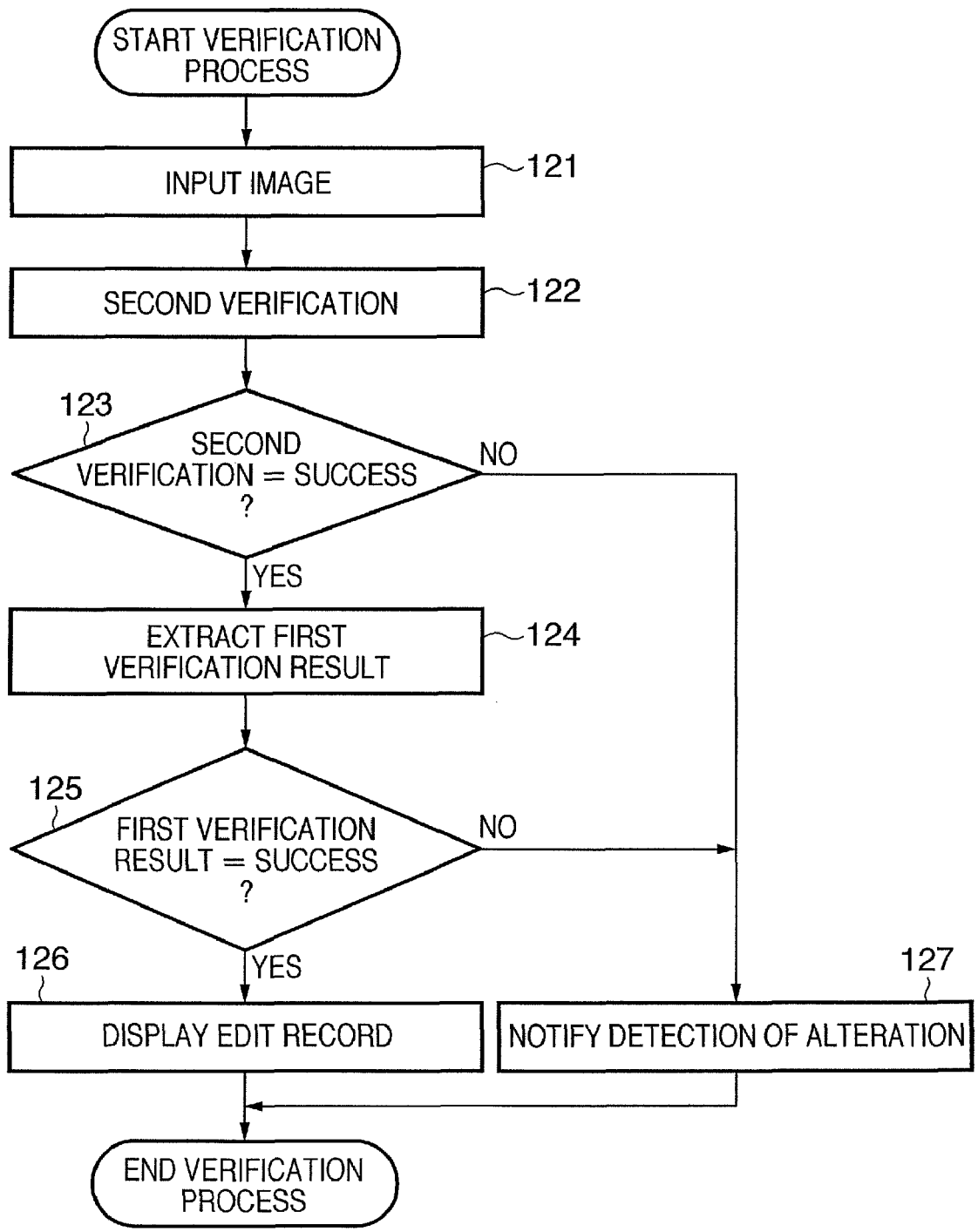
FIG. 12 is a flowchart showing another example of the verification process according to the first embodiment.

The sequence of another verification process to be executed by the image verification apparatus 13 in this embodiment will be described below with reference to FIG. 12.

The image input unit 101 inputs an image data file to be verified (step 121). The second verification unit 102 executes the second verification process using the edited image data, first verification result, edit record, and second verification data included in the input image data (step 122), and checks if the verification process has succeeded (step 123). That is, as can be seen from the above description, the second verification unit 102 checks in steps 122 and 123 if the image data has been altered between this image verification apparatus 13 and the image edit apparatus.

If the verification process has succeeded in step 123, the process advances to step 124; otherwise, the process advances to step 127.

In step 124, the first verification result information included in the input image data file is extracted. It is checked in step 125 based on the extracted first verification result information if the first verification result indicates a success. If the first verification result indicates a success, the process advances to step 126. On the other hand, if the first verification result indicates a failure, i.e., if the image data had been altered between the image input apparatus 11 and image edit apparatus 12, the process advances to step 127.

Figure 15:
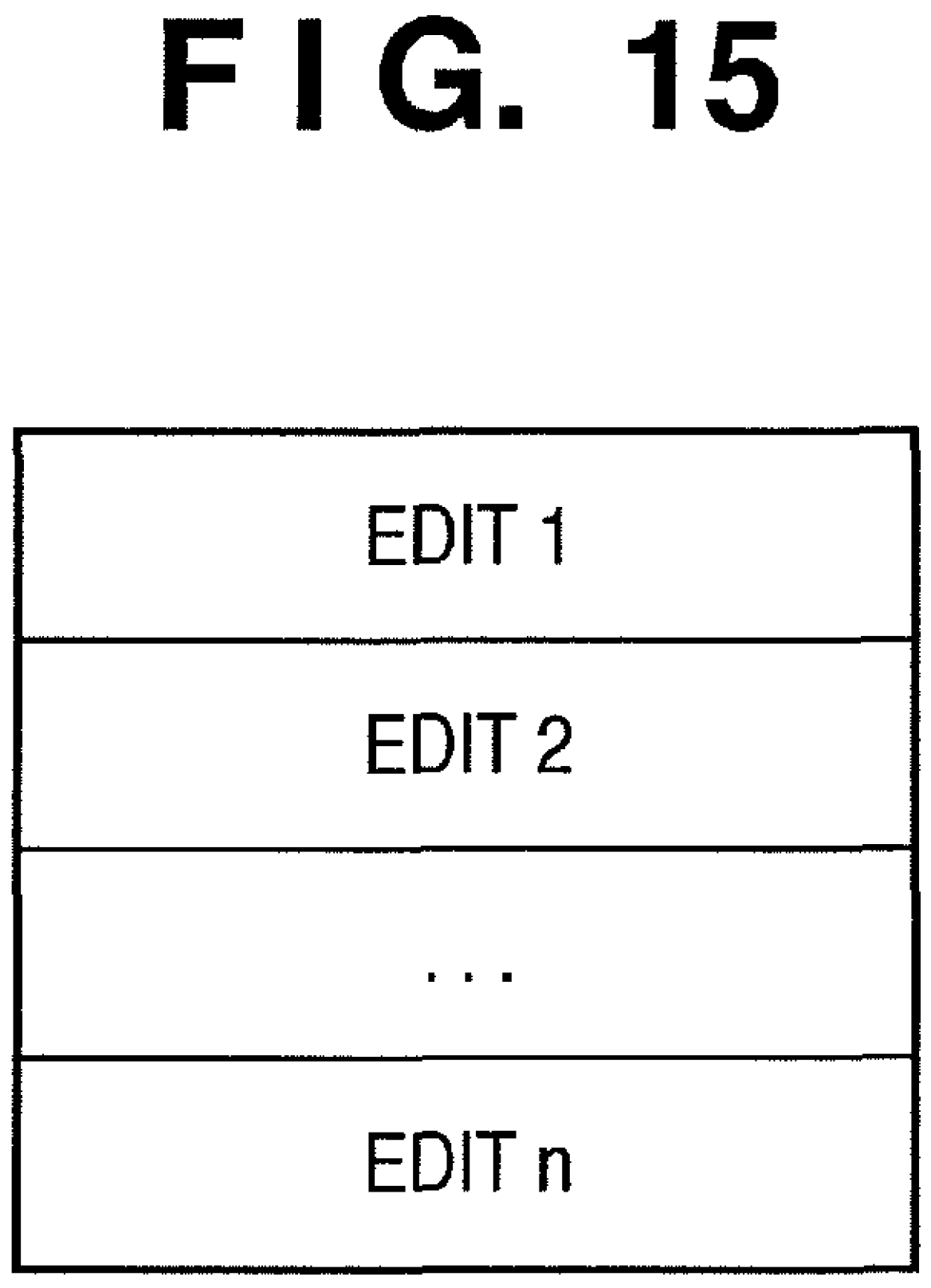

If the process reaches step 126, i.e., if both the two verification processes have succeeded, the edit record is displayed, as shown in FIG. 15.

On the other hand, if the verification process has failed (NO in one of steps 123 and 125), a message indicating that "the verification process has failed" is displayed.

If NO is determined in step 125, this means that the image data has been altered between the image input apparatus 11 and image edit apparatus 12, but it has not been altered between the image edit apparatus 12 and image verification apparatus 13. Therefore, if NO is determined in step 125, a message indicating an alteration between the image input apparatus 11 and image edit apparatus 12 may be displayed in step 127. For example, as shown in FIG. 14, the first verification result indicating "unsuccessful" or "alteration before image edit processes" may be displayed, and the edit record may be displayed.

The modification example of the sequence of the verification process in this embodiment has been explained. By executing the image input process, image edit process, and image verification process, as described above, whether or not original image data, edited image data, and edit record have been altered can be verified.

SECOND EMBODIMENT

In the above embodiment (first embodiment), the image input apparatus 11 supplies captured image data to the image edit apparatus 12, which applies edit processes to the image data and supplies the image data that has undergone the edit processes to the image verification apparatus 13.

However, the present invention is not limited to such a specific sequence. For example, the image data output from the image edit apparatus 12 may be input to the image edit apparatus 12 again to repeat the image edit processes. Hence, the second embodiment will explain a technique for repeating the image edit processes in the image edit apparatus 12.

Note that the arrangement and processing sequence of the image input apparatus 11 of this embodiment are the same as those in the first embodiment, and a repetitive description thereof will be avoided. Also, the arrangements of the image edit apparatus 12 and image verification apparatus 13 are also the same as those in the first embodiment, and a repetitive description thereof will be avoided. The image edit process in the image edit apparatus 12 and the image verification process in the image verification apparatus 13, which are different from those in the first embodiment, will be described hereinafter.

<Sequence of Edit Process>

Figure 18:
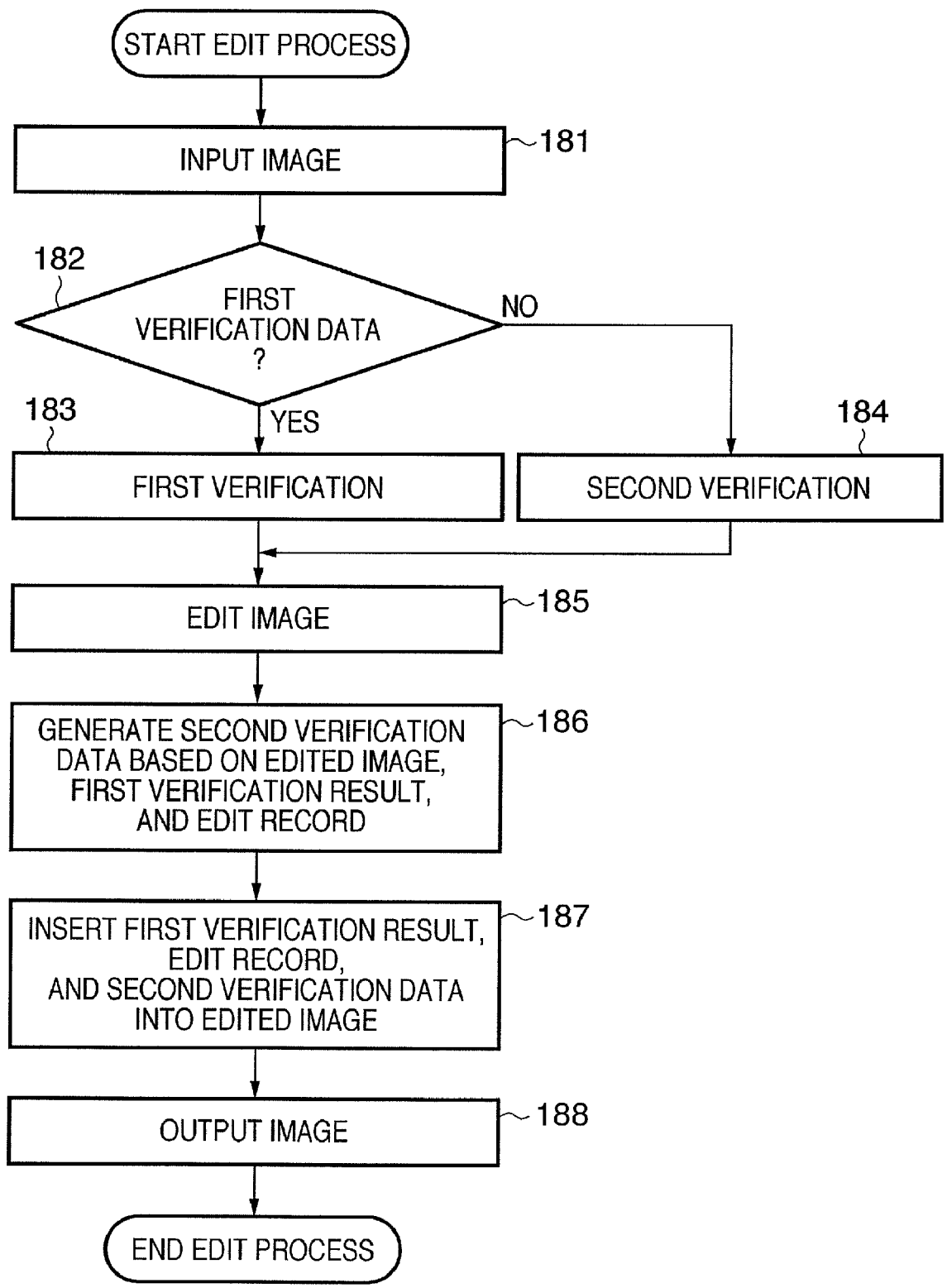
FIG. 18 is a flowchart showing the sequence of an edit process according to the second embodiment.

The sequence of the edit process executed by the image edit apparatus according to this embodiment will be described below with reference to FIG. 18. FIG. 18 is a flowchart showing the edit process applicable to this embodiment.

The image input unit 71 inputs an image data file selected by the user by operating the mouse (step 181). The verification unit 72 checks if the first verification data or the second verification data is appended to the last field of the input image data file (step 182). If the first verification data is appended to the last field of the image data file, the process advances to step 183; if the second verification data is appended, the process advances to step 184.

In step 183, the verification unit 72 executes the first verification process for the first verification data. On the other hand, in step 184 the verification unit 72 executes the second verification process for the second verification data. That is, in this embodiment, the verification unit 72 serves as a first verification processing unit that verifies the first verification data or a second verification processing unit that verifies the second verification data in accordance with the input image data.

After that, the image edit unit 73 applies desired image edit processes to the input image data in accordance with an operator's instruction (step 185). Upon completion of all the edit processes, i.e., upon detection of a save instruction input of the edited image, the verification data generation unit 74 generates second verification data based on the image data edited by the image edit unit 73, the edit record, and the first or second verification result of the verification unit 72 (step 186). The combining unit 75 inserts the first or second verification result, edit record, and second verification data into the image data edited by the image edit unit 73 (step 187). Finally, the combining unit 75 outputs the generated image data from the image output unit 76 as one file (step 188).

Figure 13:
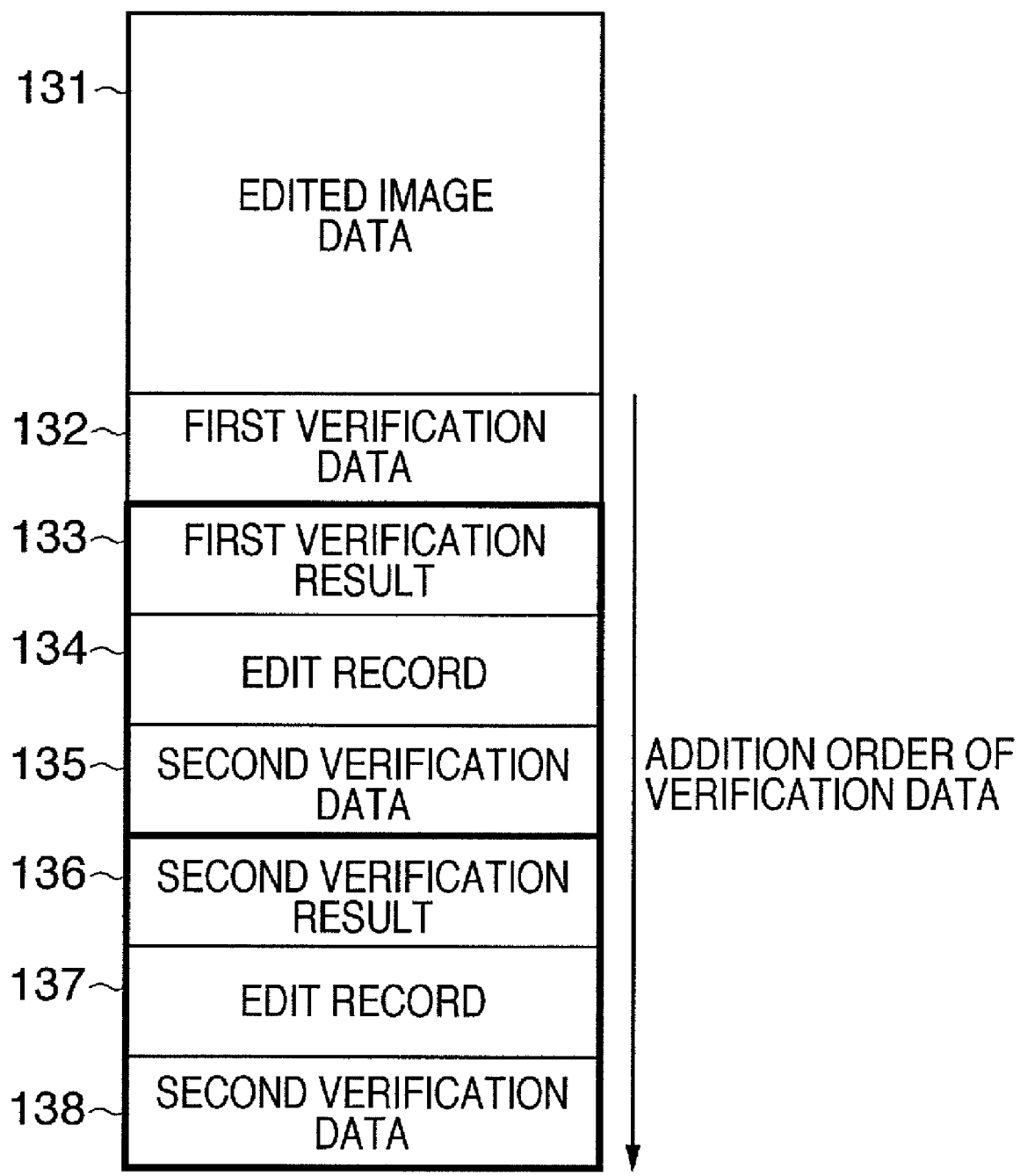
FIG. 13 shows the format of edited image data according to the embodiment.

The structure of the image data output from the image output unit 76 in the second embodiment will be described below. FIG. 13 shows an example of the image data after execution of the two image edit processes using the image edit apparatus 12 of this embodiment. As shown in FIG. 13, in the first image edit process, image data including edited image data 131, first verification data 132, first verification result 133, edit record 134, and second verification data 135 is output. After that, in the second image edit process, the image data including a second verification result 136, edit record 137, and second verification data 138 in addition to the data 131 to 135 of the previous process is output. Sets each including a verification result, edit record, and verification data are added in the order shown in FIG. 13.

Note that the second verification process in step 184 should be executed using the second verification data (data 138 in FIG. 13) appended to the last field of the input image data. This is because the second verification data appended to the last field of the image data is generated using the edited image data 131 as the final edit result. Since original image data (in case of the first verification data) and the edited image data during the edit processes (in case of the second verification data) required to verify other first and second verification data (data 132 and 135 in FIG. 13) are not included in the input image data, the verification processes using these verification data cannot be executed. For this reason, since the first verification data 132 and second verification data 135 in the image data shown in FIG. 13 are not always required in the subsequent image verification process, they need not always be included in the image data.

The sequence of the edit process according to the second embodiment has been explained.

<Sequence of Verification Process>

Figure 19:
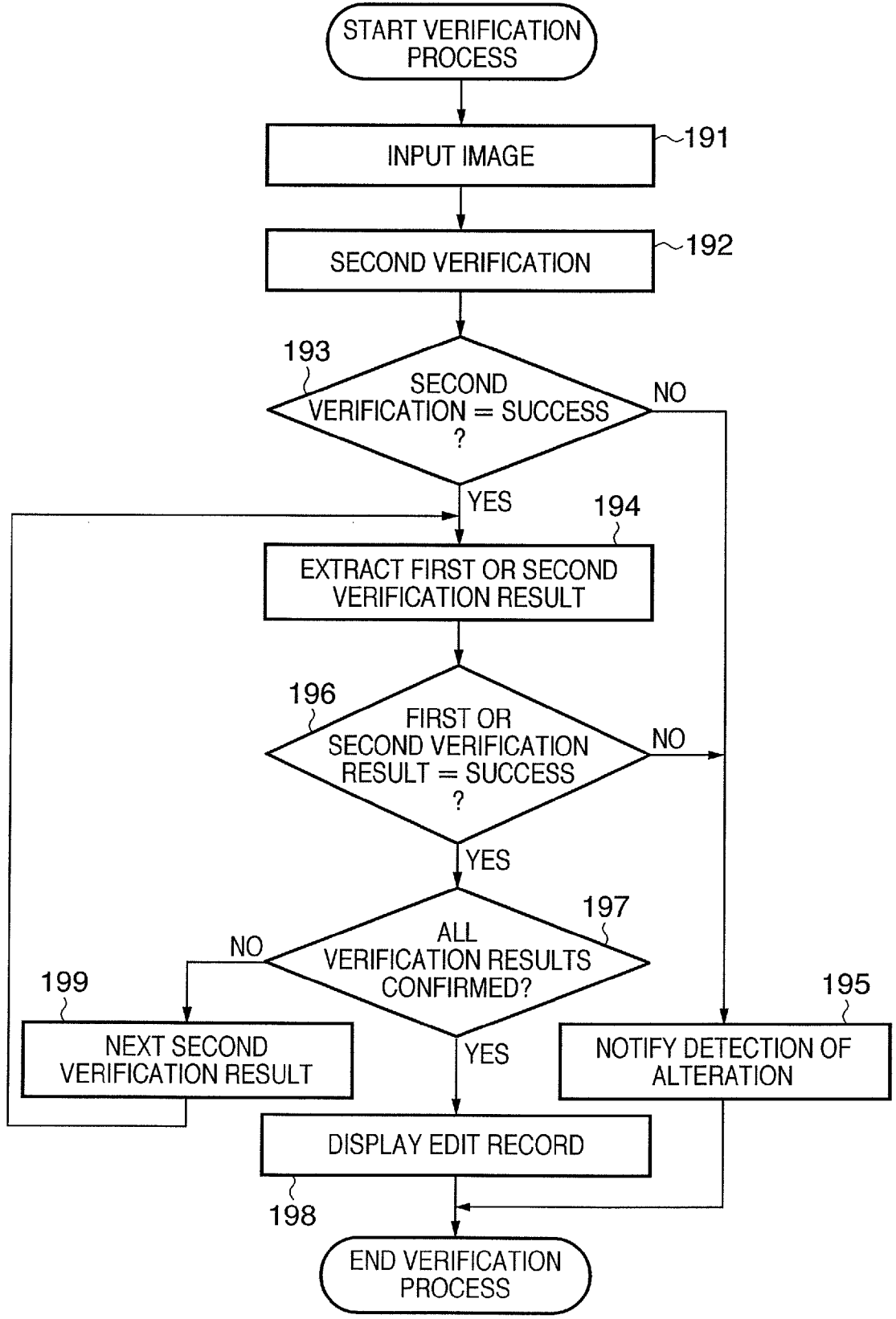
FIG. 19 is a flowchart showing the sequence of a verification process according to the second embodiment.

The verification process in the image verification apparatus 13 according to the second embodiment will be described below with reference to the flowchart shown in FIG. 19.

The image input unit 101 inputs an image data file to be verified according to an operator's instruction (step 191). The second verification unit 102 executes the second verification process using the edited image data, first verification result, edit record, and second verification data included in the input image data (step 192), and checks if the verification process has succeeded (step 193). If the verification process has succeeded, the process advances to step 194; otherwise, the process advances to step 195. Note that the second verification data used in step 192 is that appended to the last field in the image data, as described above.

In step 194, the second verification unit 102 extracts the first or second verification result included in the input image data to check if the first or second verification result indicates a success (step 196). If the first or second verification result indicates the success, the process advances to step 197; if it indicates a failure, the process advances to step 195. The unit 102 confirms if all the verification results are confirmed (step 197). If all the verification results are confirmed, the process advances to step 198; if a verification result to be confirmed still remains, the process advances to step 199.

In step 199, the second verification unit 102 specifies the next second verification result, and the process returns to step 194.

After the above processes, if all the verification processes have succeeded (Y in step 197), the verification result display unit 103 displays the edit record (step 198). On the other hand, if the verification process has failed (N in either step 193 or 196), the unit 103 displays (informs) a message indicating that "the verification process has failed" (step 195). Note that the stage in which the verification failure has occurred, i.e., that in which an alteration has been made may be displayed.

The sequence of the verification process according to the second embodiment has been explained. That is, in the second embodiment, when a plurality of second verification data are appended to the image data, the second verification process is executed using the second verification data appended to the last of image data. If the second verification result has succeeded, the contents of the first or second verification result appended to the image data are confirmed in the order opposite to that of execution of verifications (i.e., in turn from the last data of image data).

As described above, by executing the image edit process and image verification process according to the second embodiment, even when the image edit process is repetitively executed, the image verification apparatus 13 can confirm all the edit records executed by the image edit apparatus 12.

THIRD EMBODIMENT

In the first and second embodiments, when the verification process of the image verification apparatus 13 has succeeded, the edit record information shown in FIG. 14 or 15 is finally displayed on the monitor 32. That is, the image verification apparatus can verify at least whether or not image data has been altered by an apparatus other than the image input apparatus 11 and image edit apparatus 12. However, at the same time, the image verification apparatus 13 presents, to the verifier, information required for him or her to judge whether or not the image data as the edit result of the image edit apparatus 12 accepted in advance falls within a permissible edit range with respect to the original image data.

Hence, in the third embodiment, the image verification apparatus 13 determines whether or not predetermined image edit processes are applied to image data to be verified, and displays that determination result on the monitor 32.

Note that the arrangements and processing contents of the image input apparatus 11 and image edit apparatus 12 in the third embodiment are the same as those of the first and second embodiments, and a repetitive description thereof will be avoided. Also, the arrangement of the image verification apparatus 13 is the same as that of the first embodiment, and a repetitive description thereof will be avoided. Therefore, the image verification process of the image verification apparatus, which is different from the first and second embodiments, will be described hereinafter.

<Sequence of Verification Process>

Figure 20:
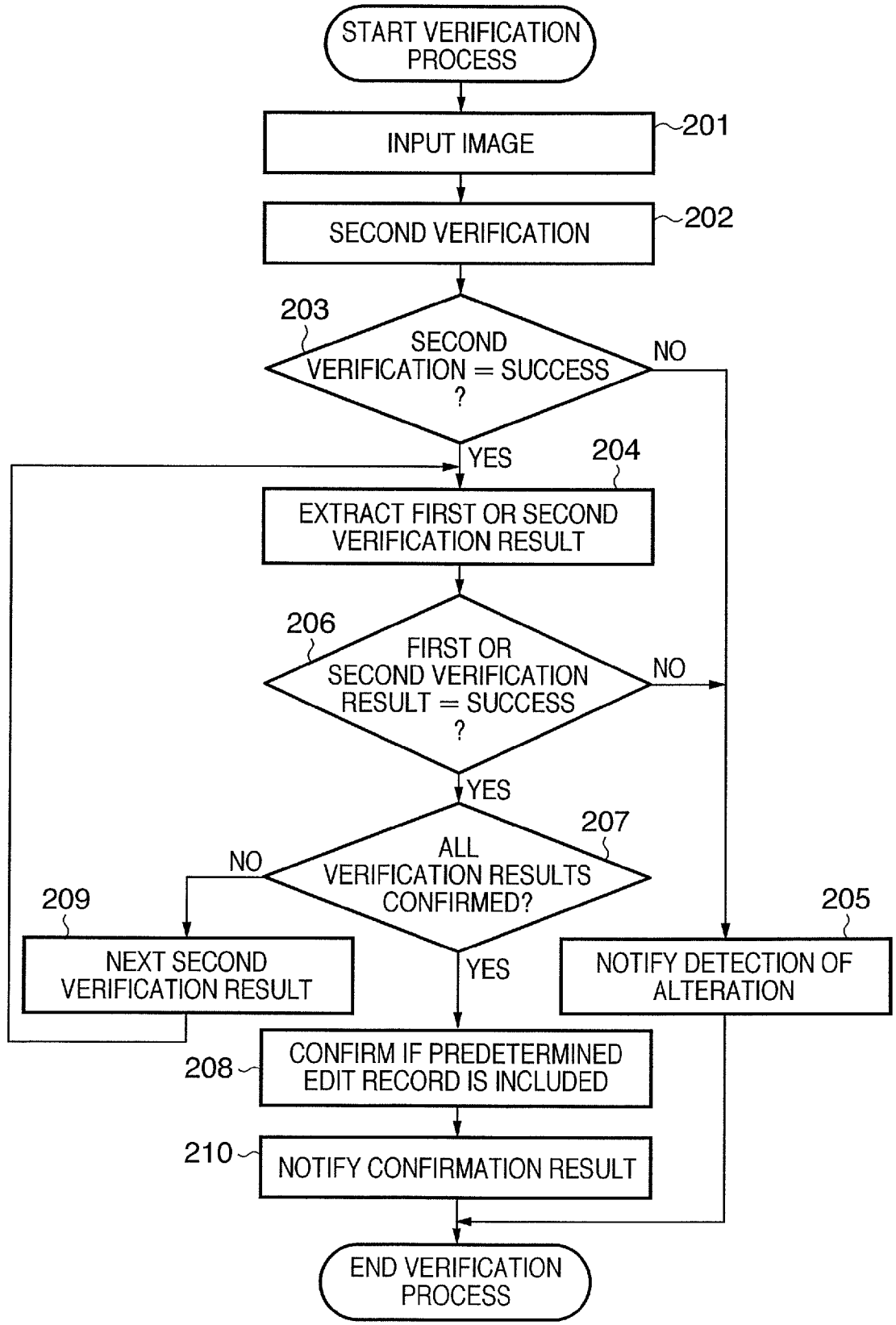
FIG. 20 is a flowchart showing the sequence of a verification process according to the third embodiment.

The sequence of the verification process to be executed by the image verification apparatus of this embodiment will be described below with reference to FIG. 20.

The image input unit 101 inputs an image data file to be verified, which is designated by the user via a mouse operation (step 201). The second verification unit 102 executes the second verification process using the edited image data, first verification result, edit record, and second verification data included in the input image data (step 202), and checks if the verification process has succeeded (step 203). If the verification process has succeeded, the process advances to step 204; otherwise, the process advances to step 205.

In step 204, the second verification unit 102 extracts the first or second verification result included in the input image data. The unit 102 then checks in step 206 if the first or second verification result indicates a success. If the first or second verification result indicates the success, the process advances to step 207; if it indicates a failure, the process advances to step 205. The unit 102 confirms if all the verification results are confirmed (step 207). If all the verification results are confirmed, the process advances to step 208; if a verification result to be confirmed still remains, the process advances to step 209. In step 209, the second verification unit 102 specifies the next second verification result, and the process returns to step 204.

Finally, if all the verification processes have succeeded (Y in step 207), the verification result display unit 103 confirms if the edit record appended to the image data includes predetermined edit record items (step 208). Then, the unit 103 displays the confirmation result on the monitor 32 or the like. On the other hand, if the verification process has failed (N in either step 203 or 206), the unit 103 displays a message indicating that "the verification process has failed" (step 205).

Note that the predetermined edit record items may be held in the image verification apparatus 13 since the user inputs edit record items to be confirmed in advance, and may be used as needed in step 208. For example, assume that the verifier sets "paste" as an inhibited edit item (each inhibited edit item is stored in advance in the HD to have a pre-set file name). Upon displaying the edit record of the image of interest, if "paste" is included in the edit record of that image, the apparatus 13 displays "paste" in a mode different from other edit items (e.g., in a color different from that of other edit items), thus notifying the verifier of it.

The sequence of the verification process according to the third embodiment has been described.

By executing the image verification process, as described above, whether or not a predetermined image edit process is applied to image data input to the image verification apparatus 13 can be confirmed. For example, when an image editor is not permitted to apply a predetermined image edit process, the image edit process which is not permitted is input as an inhibited edit item, thus confirming whether or not that image edit process is applied to the image data.

In the above example, an inhibited edit item is set. Alternatively, an edit item which is permitted may be set. In fact, edit items which are permitted or not need only be determined.

FOURTH EMBODIMENT

In the first embodiment, the second verification data is generated irrespective of the result of the first verification process in the image edit apparatus 12.

However, the present invention is not limited to that specific process. For example, only when the first verification process succeeds, the second verification data may be generated. Hence, the fourth embodiment will exemplify a case wherein the second verification data is generated only when the first verification process succeeds in the image edit apparatus.

Note that the arrangements and processing sequences of the image input apparatus 11 and image verification apparatus 13 of this embodiment are the same as those of the first embodiment, and a repetitive description thereof will be avoided. Also, the arrangement of the image edit apparatus 12 is the same as that of the first embodiment, and a repetitive description thereof will be avoided. Therefore, the image edit process in the image edit apparatus 12 different from the first embodiment will be described hereinafter.

<Sequence of Edit Process>

Figure 21:
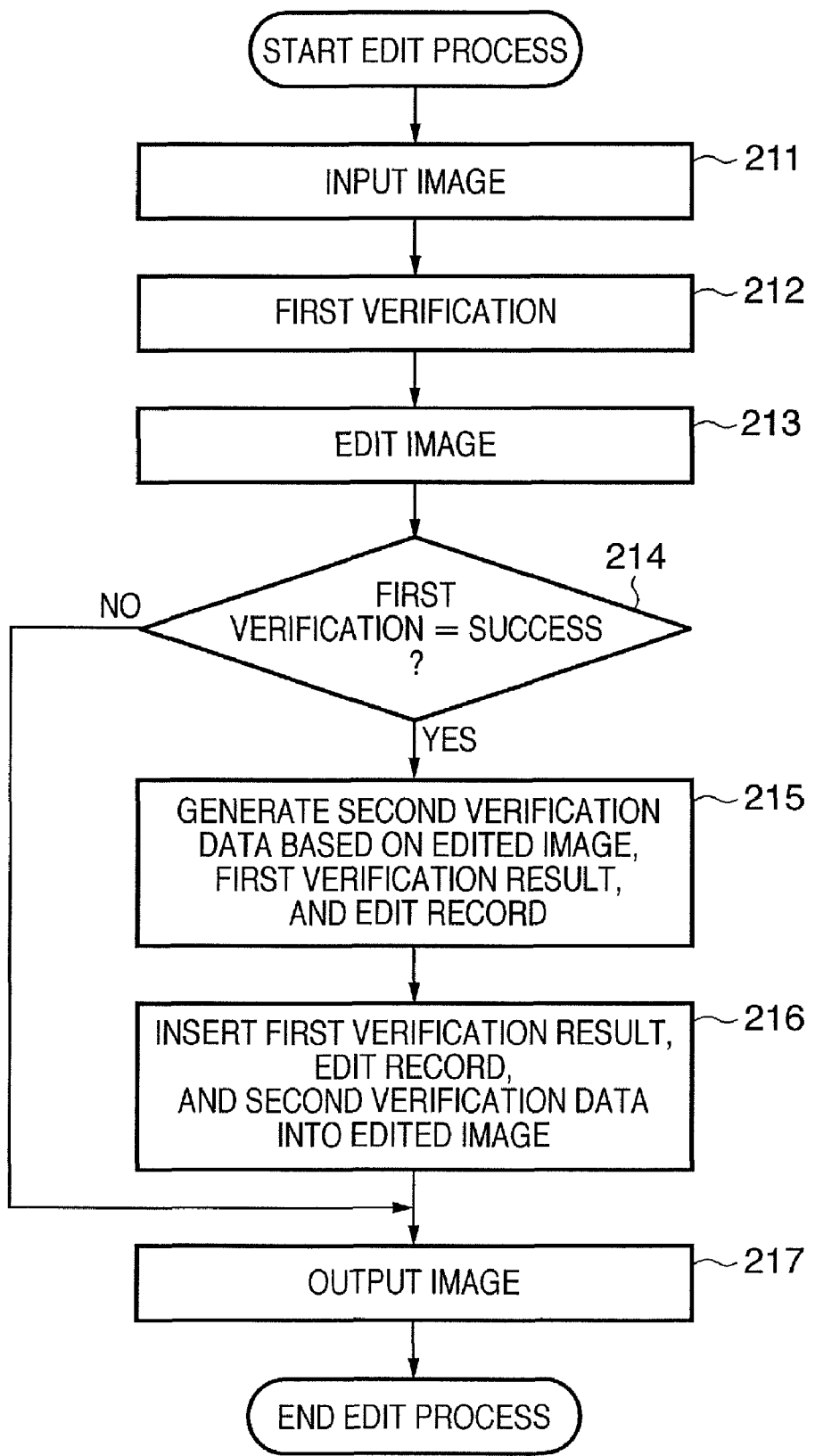
FIG. 21 is a flowchart showing the sequence of an edit process according to the fourth embodiment.

The edit process to be executed by the image edit apparatus 12 according to the fourth embodiment will be described below with reference to the flowchart of FIG. 21.

The image input unit 71 inputs an image data file selected by an editor using the mouse or the like (step 211). Next, the verification unit 72 verifies the first verification data appended to the input image data (step 212). After that, the image edit unit 73 applies desired image edit processes to the input image data in accordance with an editor's instruction (step 213). Upon detection of a save instruction input by the editor, the process advances to step 214 to check if the first verification process executed in step 212 has succeeded. If the first verification process has succeeded, the process advances to step 215; if it has failed, the process advances to step 217.

If the process reaches step 215, the second verification data generation unit 74 generates second verification data based on the edited image data, edit record, and first verification result of the verification unit 72. The combining unit 75 inserts the first verification result, edit record, and second verification data in the image data edited by the image edit unit 73 (step 216). Finally, the combining unit 75 outputs the generated image data as one file from the image output unit 76 (step 217).

Upon implementing the aforementioned edit process by an image processing application or the like, the checking process in step 214 is executed when the image processing application saves the (edited) image data. When the image processing application has a "verification data generation" menu, the "verification data generation" menu may be normally set grayed out, and only when it is determined that the first verification process has succeeded, the "verification data generation" menu may be selectable.

The sequence of the edit process according to the fourth embodiment has been described.

As described above, according to the fourth embodiment, only when the first verification process has succeeded, the image edit apparatus can generate the second verification data. In this case, when the first verification process has failed (for example, when an alteration has been made between the image input apparatus 11 and image edit apparatus 12), no second verification data is appended to the image data output from the image edit apparatus 12.

The embodiments according to the present invention are as described above. In the above embodiments, a content to be verified is image data input by the image input apparatus 11. However, the content to be verified is not limited to image data, and the type of content is not particularly limited as long as it is digital information. For example, document data created by a document edit apparatus may be used as the content to be verified.

The embodiments according to the present invention have been explained. The functions of an apparatus which generates a content as information to be verified (corresponding to the image input apparatus), an apparatus which edits the content (corresponding to the image edit apparatus), and an apparatus which verifies the content (corresponding to the image verification apparatus) can be implemented by executing computer programs. Therefore, the scope of the present invention includes the computer programs. Normally, the computer programs are stored in a computer-readable storage medium such as a CD-ROM or the like, and the medium is set in a medium access device (CD-ROM drive or the like) of a computer to copy or install the computer programs in a system, so as to allow execution of the programs. Therefore, the scope of the invention includes such a medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-304548, filed Nov. 9, 2006, which is hereby incorporated by reference herein in its entirety.

The invention claimed is:

1. A content edit apparatus for editing a digital content file that includes a content to be verified, said apparatus comprising:

first verification means for verifying first verification data appended to the digital content file to determine whether or not the content included in the digital content file has been altered;

holding means for holding verification result information indicating a verification result of said first verification means;

edit means for editing the content in the digital content file;

edit record generation means for generating edit record information of the content edited by said edit means;

second verification data generation means for generating second verification data using the verification result information held by said holding means, the edit record information generated by said edit record generation means, and the edited content edited by said edit means; and output means for combining the content edited by said edit means, the verification result information held by said holding means, the edit record information, and the second verification data to obtain an edited digital content file, and outputting the edited digital content file.

2. The apparatus according to claim 1, wherein the content is image data generated by an image input apparatus.

3. The apparatus according to claim 1, wherein the first verification data is second verification data of an edit record appended by another information processing apparatus.

4. The apparatus according to claim 1, wherein at least one of the first verification data and the second verification data is a digital signature.

5. The apparatus according to claim 1, wherein at least one of the first verification data and the second verification data is an MAC (Message Authentication Code).

6. The apparatus according to claim 1, wherein when the digital content file to be verified includes second verification data of an edit record, said first verification means verifies the second verification data as the first verification data, and
said output means outputs the edited digital content file by appending the second verification data generated by said second verification means to the second verification data included in the digital content file before editing.

7. A method of controlling a content edit apparatus for editing a digital content file that includes a content to be verified, said method comprising:
a first verification step of verifying first verification data appended to the digital content file to determine whether or not the content included in the digital content file has been altered;
a holding step of holding verification result information indicating a verification result of said first verification means;
an edit step of editing the content in the digital content file;
an edit record generation step of generating edit record information of the content edited in the edit step;
a second verification data generation step of generating second verification data using the verification result information held in said holding step, the edit record information generated in said edit record generation step, and the edited content edited in said edit step; and
an output step of combining the content edited in the edit step, the verification result information held in said holding step, the edit record information, and the second verification data to obtain an edited digital content file, and outputting the edited digital content file.

8. A computer program embodied in a non-transitory computer-readable medium, which when loaded and executed by a computer causes the computer to function as means according to claim 1.

9. A non-transitory computer-readable storage medium storing a computer program for causing an apparatus to perform a method according to claim 7.

10. A content verification apparatus for verifying a digital content file edited by a content edit apparatus according to claim 1, said apparatus comprising:
second verification means for verifying second verification data included in the digital content file to be verified; and
determination means for determining whether or not verification result information of said first verification means appended to the content indicates a success.

11. The apparatus according to claim 10, further comprising control means for controlling a display of an edit record appended to the content in accordance with a verification result of said second verification means and a determination result of said determination means.

12. The apparatus according to claim 10, when all verification processes of the second verification data have succeeded, and the first verification result indicates success, said control means displays the edit record.

13. A method of controlling a content verification apparatus for verifying a digital content file edited by a content edit apparatus according to claim 1, said method comprising:
a second verification step of verifying second verification data included in the digital content file to be verified; and
a determination step of determining whether or not verification result information of the first verification step appended to the content indicates a success.

14. A computer program embodied in a non-transitory computer-readable medium, which when loaded and executed by a computer causes the computer function as a content verification apparatus for verifying a digital content file edited by a content edit apparatus according to claim 1, said program causing the computer to function as:
second verification means for verifying second verification data included in the digital content file to be verified; and
determination means for determining whether or not verification result information of said first verification means appended to the content indicates a success.

15. A non-transitory computer-readable storage medium storing a computer program for causing an apparatus to perform a method according to claim 13.

* * * * *